(12) United States Patent
Miyagawa et al.

(10) Patent No.: US 6,542,178 B2
(45) Date of Patent: Apr. 1, 2003

(54) IMAGE RECORDING APPARATUS

(75) Inventors: Ichirou Miyagawa, Minamiashigara (JP); Hirofumi Saita, Minamiashigara (JP)

(73) Assignee: Fuji Photo Film Co., Ltd., Kanagawa-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/347,229

(22) Filed: Jul. 2, 1999

(65) Prior Publication Data

US 2002/0135663 A1 Sep. 26, 2002

(30) Foreign Application Priority Data

| Jul. 3, 1998 | (JP) | ............................................ 10-188681 |
| Jul. 6, 1998 | (JP) | ............................................ 10-190260 |
| Feb. 19, 1999 | (JP) | ............................................ 11-041747 |

(51) Int. Cl.[7] .................................................. B41J 27/00
(52) U.S. Cl. ..................................................... 347/256
(58) Field of Search ................................ 347/256, 258, 347/241, 244, 134

(56) References Cited

U.S. PATENT DOCUMENTS

| 4,562,567 A | * | 12/1985 | Frankfort et al. | ........ 347/246 X |
| 4,804,975 A | * | 2/1989 | Yip | .............................. 347/237 |
| 5,134,426 A | * | 7/1992 | Kataoka et al. | .............. 347/244 |
| 5,216,484 A | * | 6/1993 | Chao et al. | ................... 356/326 |
| 5,249,190 A | * | 9/1993 | Kortz et al. | .................... 372/22 |
| 5,264,869 A | * | 11/1993 | Appel et al. | ................. 347/248 |
| 5,623,509 A | * | 4/1997 | Iwano et al. | .................... 372/45 |
| 5,719,617 A | * | 2/1998 | Takahashi et al. | ........... 347/241 |
| 5,808,775 A | * | 9/1998 | Inagaki et al. | ............... 359/212 |

FOREIGN PATENT DOCUMENTS

| JP | 4-255818 | | 9/1992 | ........... G02B/26/10 |
| JP | 408240730 A | * | 9/1996 | ........... G02B/6/122 |
| JP | 9-243943 | | 9/1997 | ........... G02B/26/10 |

OTHER PUBLICATIONS

F. Agulló–López, J. M. Cabera and F. Agulló–Rueda; "Electrooptics Phenomena, Materials and Applications"; copyright 1994; Academic Press Inc., San Diago, CA 92101; pp. 34–40.*
Patent Abstracts of Japan vol. 1997, No. 03, Mar. 31, 1997 & JP 08 292388 A (Minolta Co Ltd) Nov. 5, 1996 *Abstract.
Patent Abstracts of Japan vol. 018, No. 356 (P–1765) Jul. 5, 1994 & JP 06 094974 A (Olympus Optical Co., Ltd.) Apr. 8, 1994 *Abstract.
Kightlinger and Dials: "Non Impact Printer using Optical Fibers. Nov. 1980" IBM Technical Disclosure Bulletin, vol. 23, No. 6, pp. 2362–2363, XP002120192 New York, US.

* cited by examiner

*Primary Examiner*—Judy Nguyen
(74) *Attorney, Agent, or Firm*—Sughrue Mion, PLLC

(57) ABSTRACT

A laser beam emitted from a semiconductor laser is guided to a sensitive recording medium on a drum by a focusing optical system and an optical anisotropic element. The optical anisotropic element separates the laser beam along its optical axis to produce a laser beam having two focused positions for thereby increasing the depth of focus. With the increased depth of focus, it is possible to record a highly accurate image on the sensitive recording medium even if the sensitive recording medium is displaced because the drum has its outer circumferential surface not concentric with its axis or the sensitive recording medium is lifted off the drum.

11 Claims, 22 Drawing Sheets

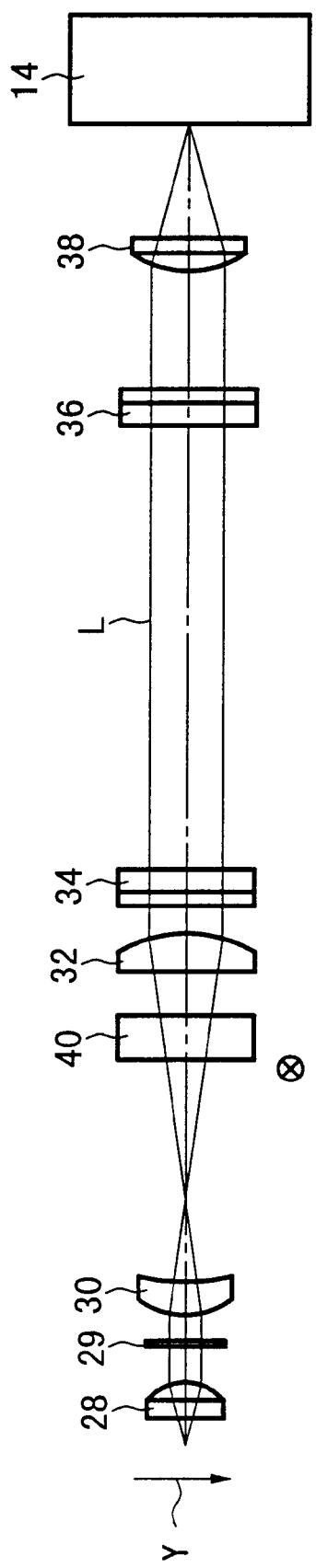
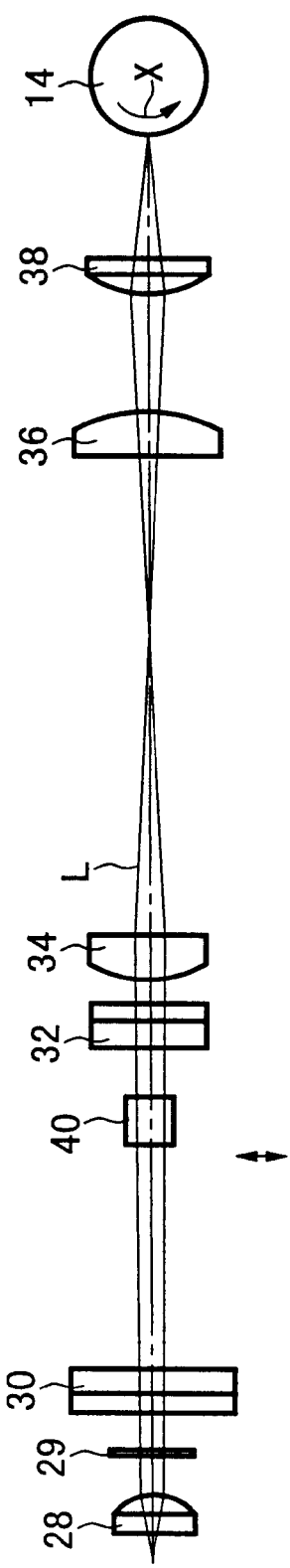
FIG. 2A
FIG. 2B

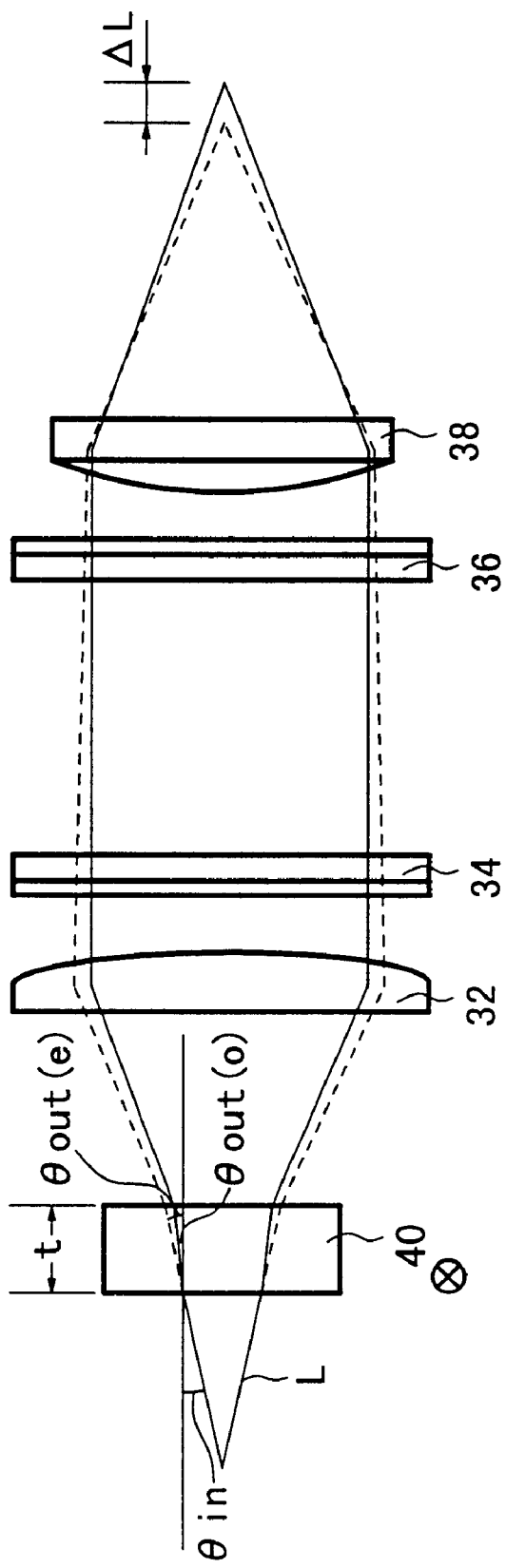

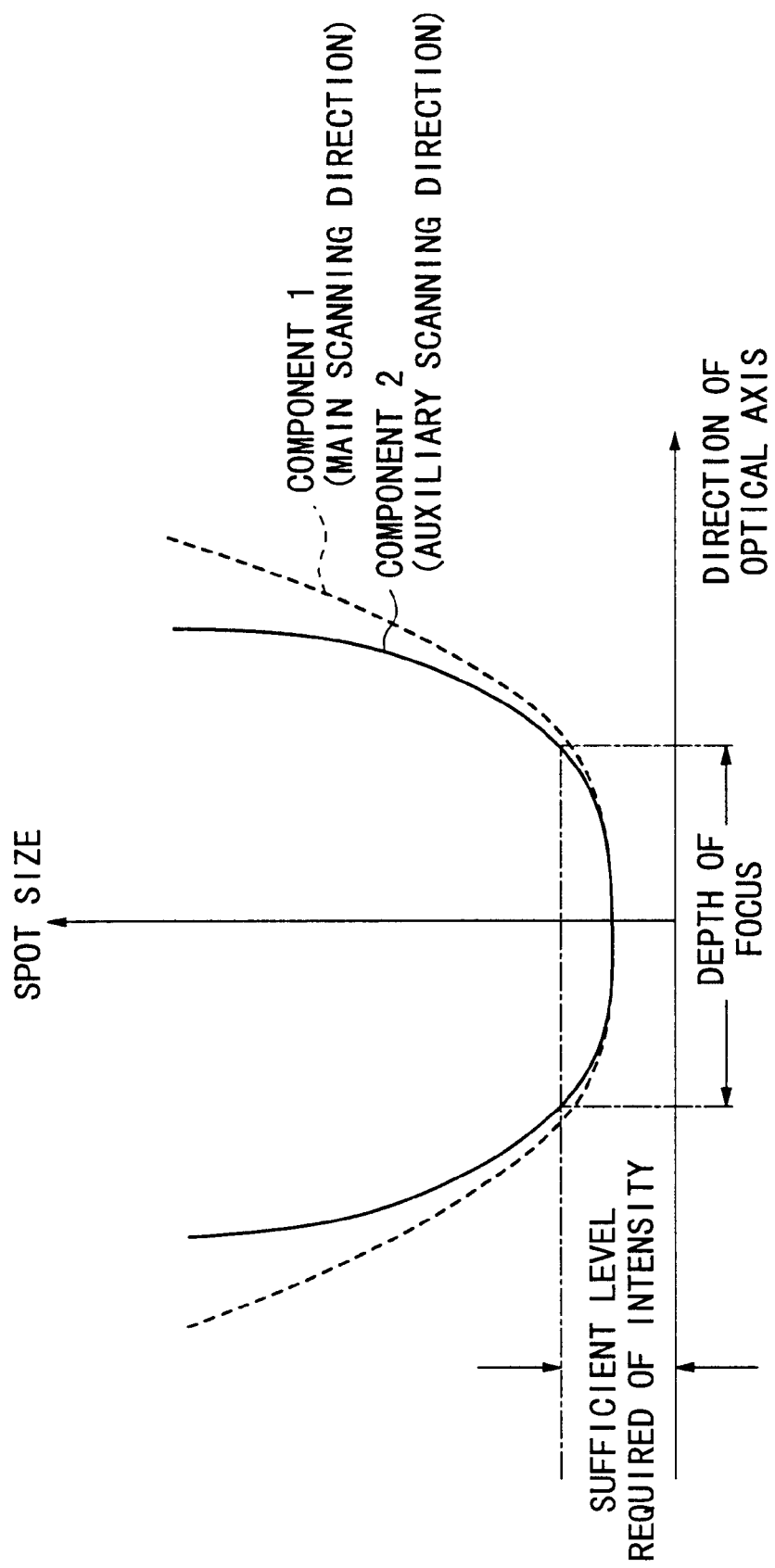

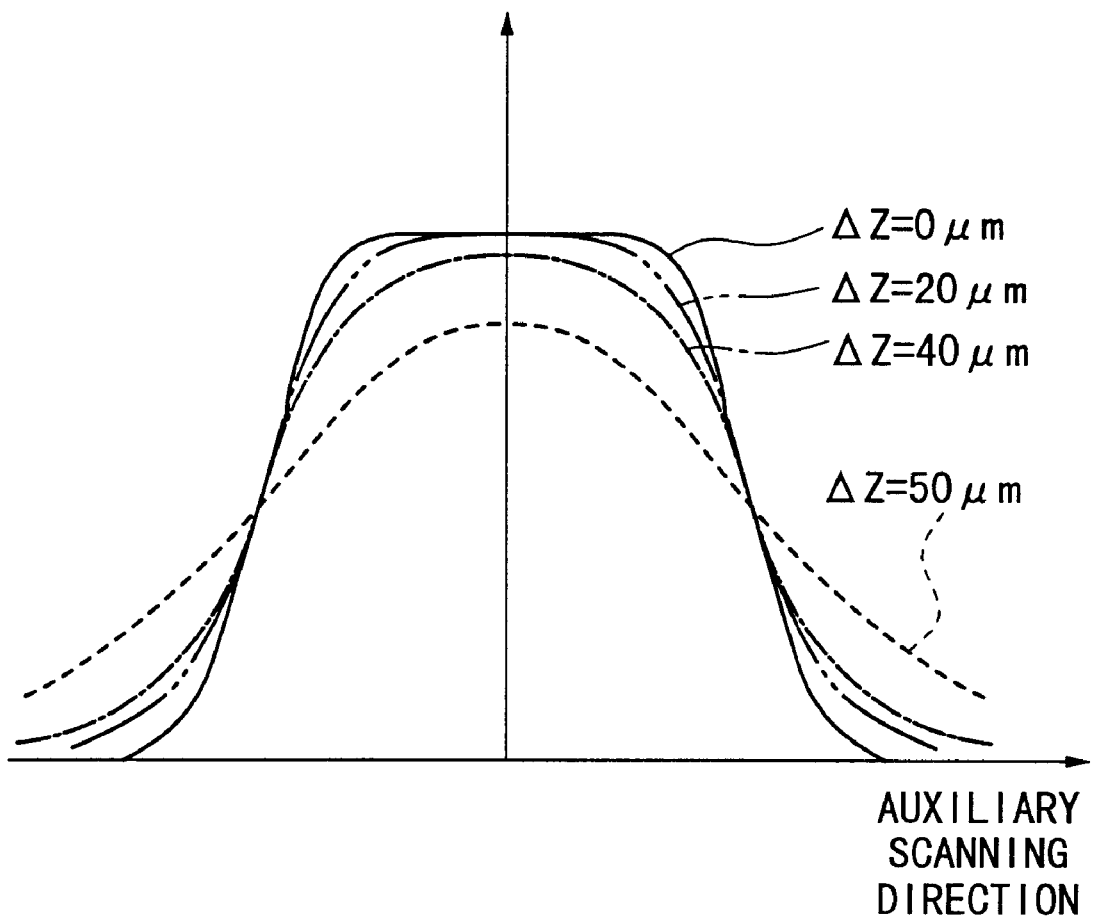

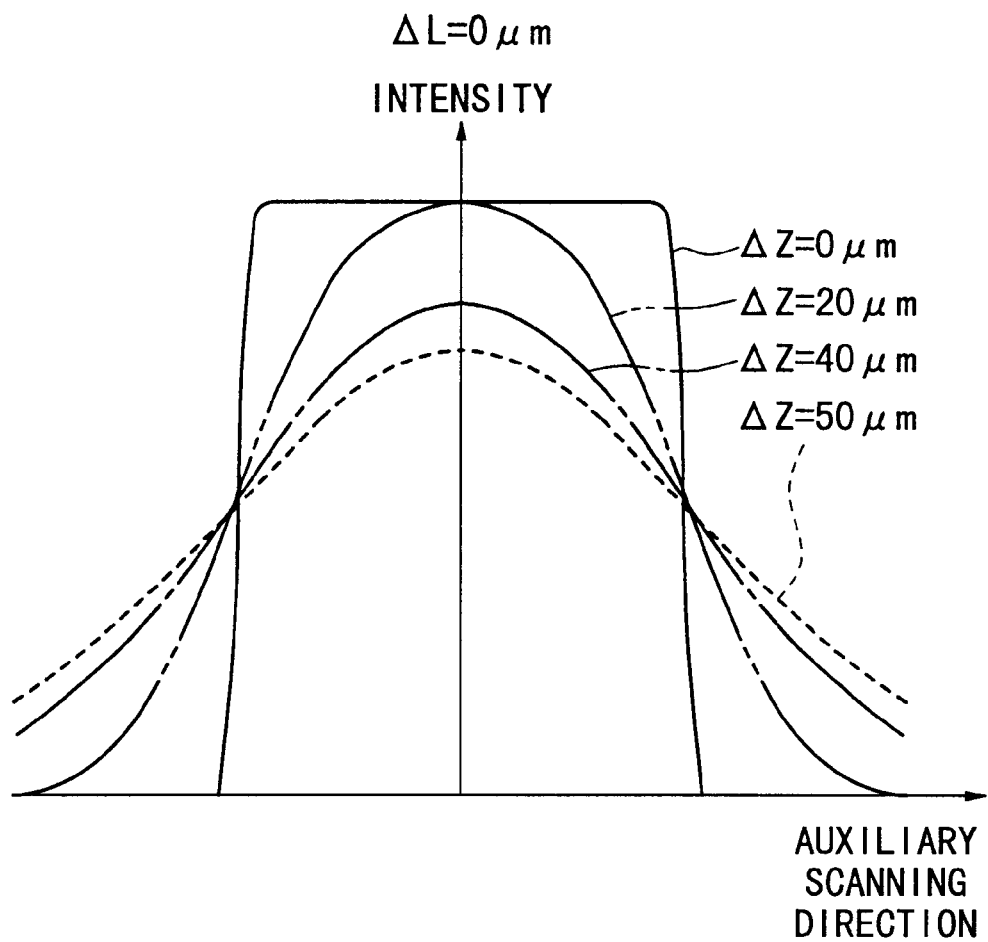

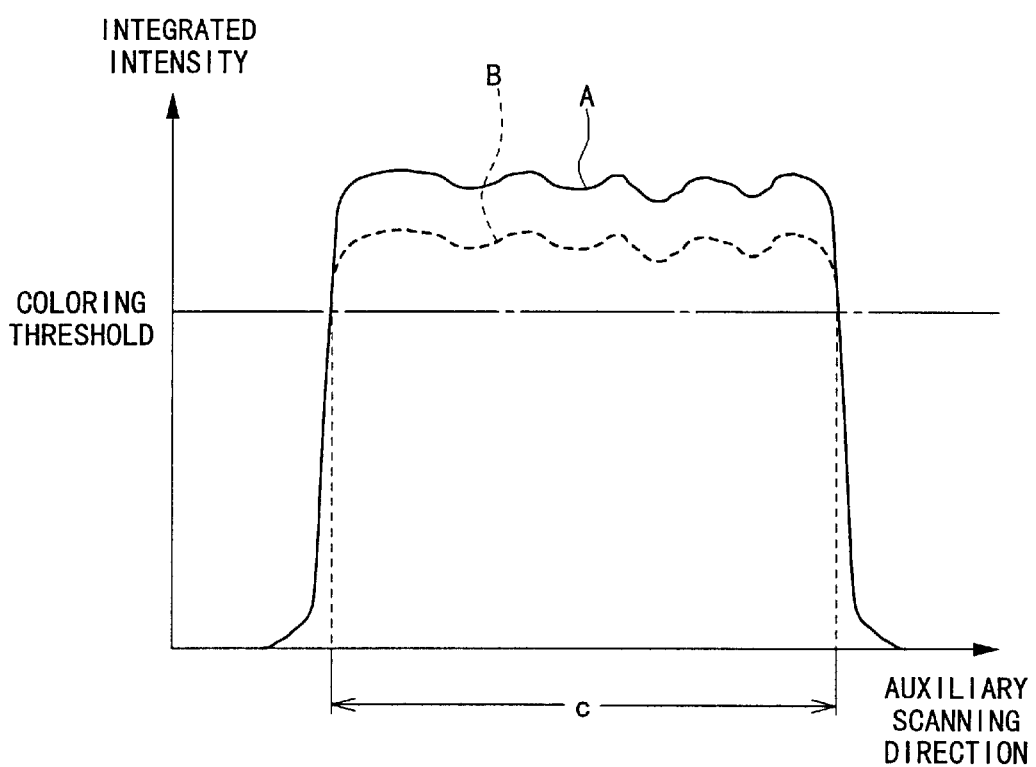

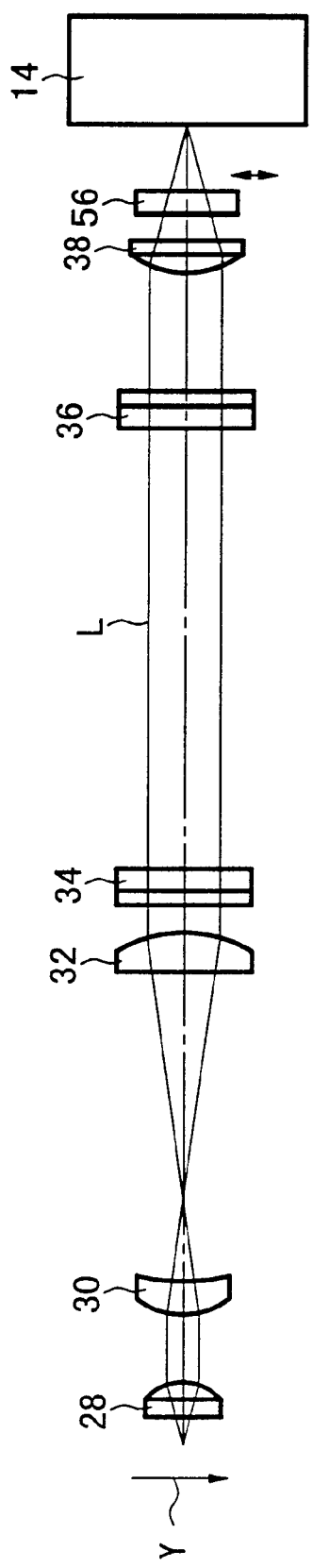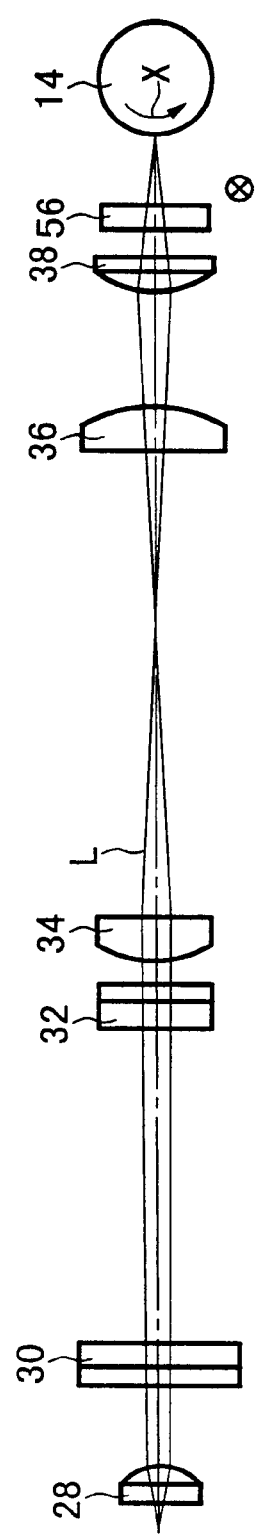
FIG. 15A
FIG. 15B

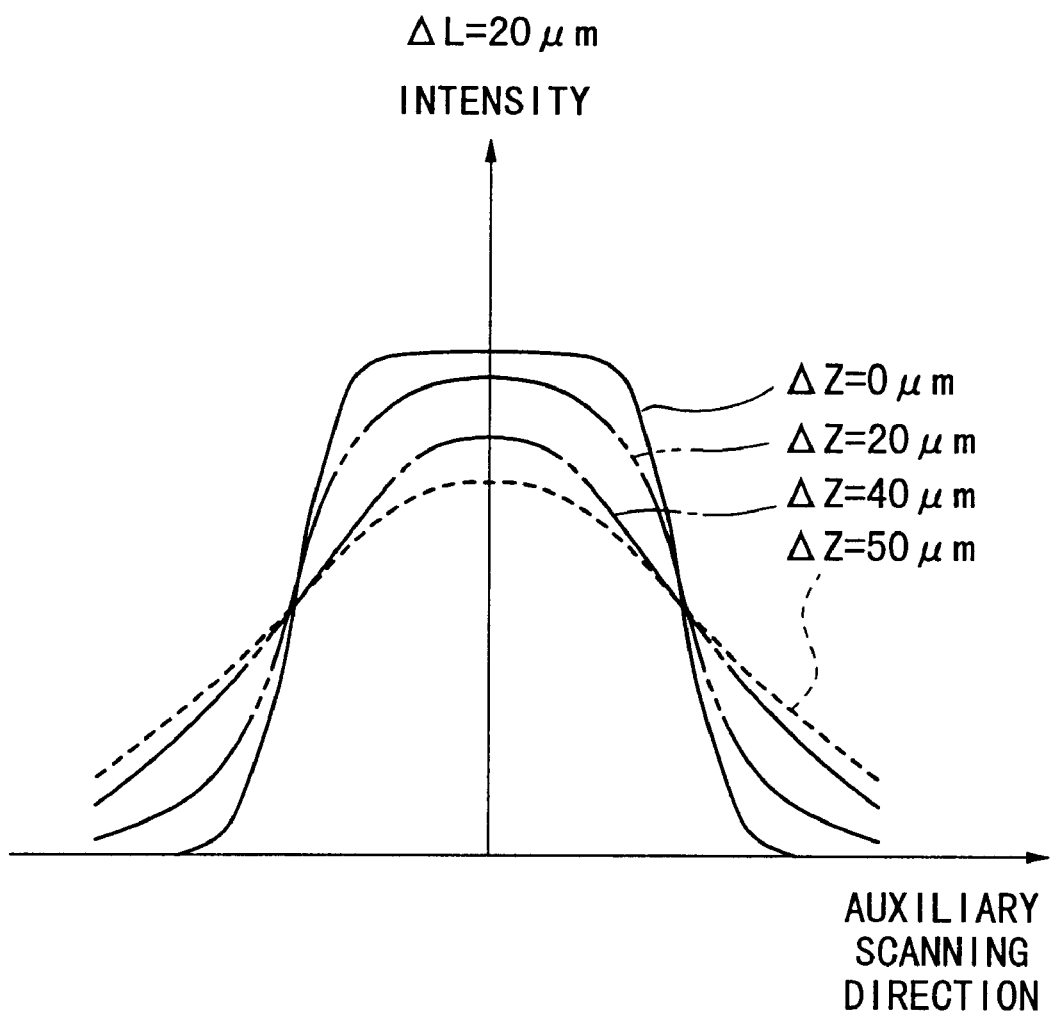

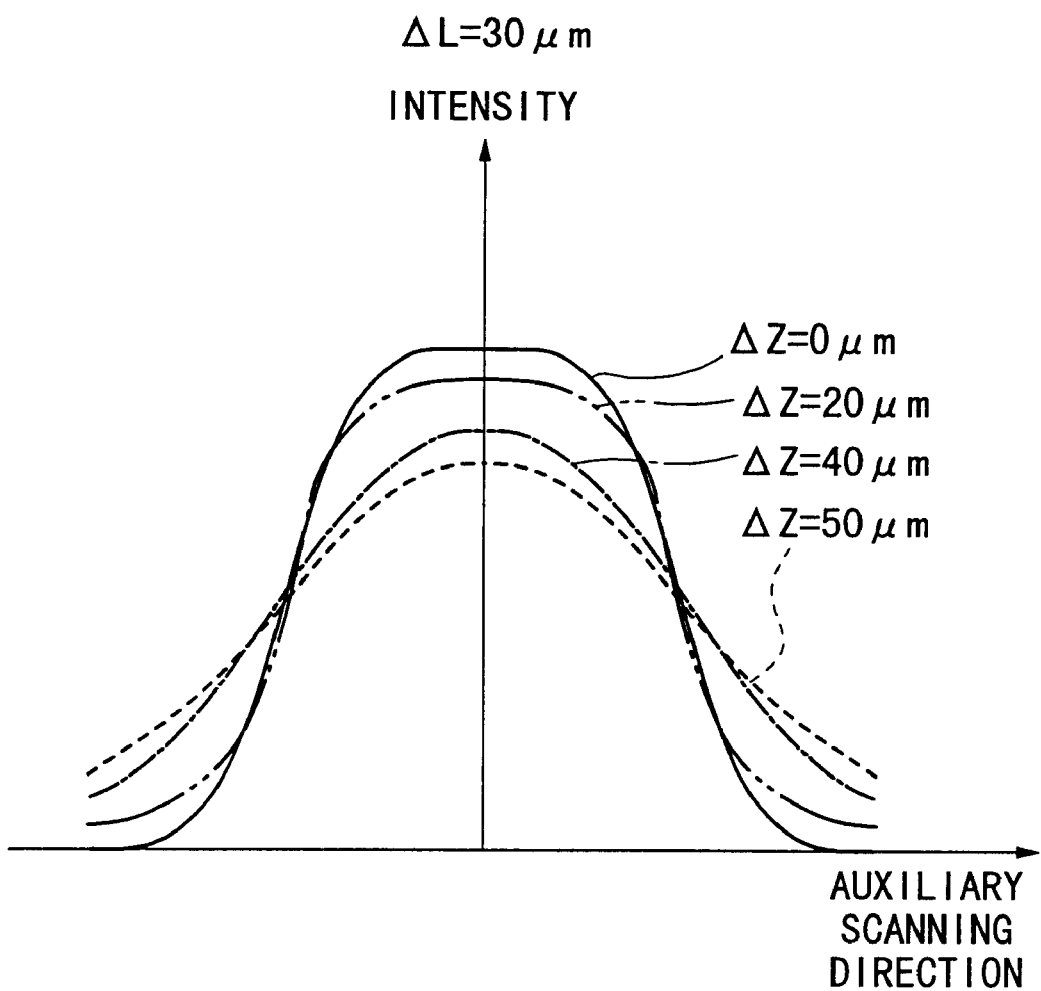

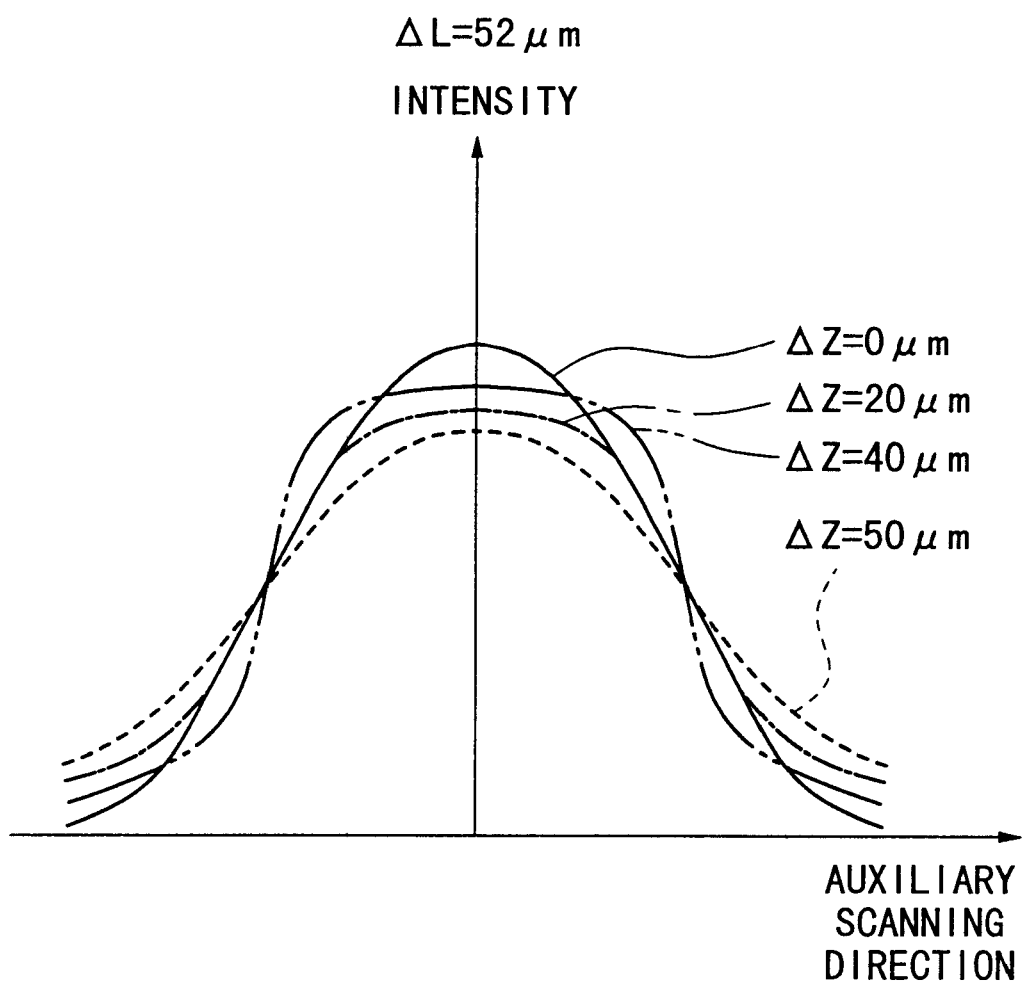

IMAGE RECORDING APPARATUS

BACKGROUND OF THE INVENTION

1. Field of the Invention

The present invention relates to an image recording apparatus for recording an image by guiding a light beam to a recording medium and moving the light beam and the recording medium relatively to each other to scan the recording medium with the light beam in main and auxiliary scanning directions.

2. Description of the Related Art

There have heretofore been known image recording apparatus in which a light beam emitted from a semiconductor laser is focused by a focusing optical system into a focal point on a photosensitive recording medium which is wound around the outer circumferential surface of a drum, and the drum is rotated at a high speed about its own axis in a main scanning direction while the light beam is deflected along the axis of the drum in an auxiliary scanning direction, for thereby recording an image on the photosensitive recording medium.

In the known image recording apparatus, if the rotating drum has its outer circumferential surface not concentric with its axis, the photosensitive recording medium is lifted off the drum, or the auxiliary scanning direction in which the light beam is deflected does not extend along the axis of the drum, then the light beam is not focused highly accurately onto the photosensitive recording medium, failing to produce a highly accurate image on the photosensitive recording medium. Particularly when a halftone dot image is to be formed on the photosensitive recording medium by way of area modulation, it is necessary to focus the light beam highly accurately onto the photosensitive recording medium because the light beam needs to be constricted to a very small beam spot.

In an attempt to alleviate the above problems for focusing the light beam accurately onto the scanned surface of the photosensitive recording medium at all times, there has been employed an automatic focusing mechanism for moving the focal point of the focusing optical system depending on the distance or displacement between the scanned surface and the focusing optical system. The automatic focusing mechanism controls the focusing optical system in order to position the scanned surface within a desired depth of focus.

The automatic focusing mechanism is capable of eliminating out-of-focus states due to positional fluctuations of the scanned surface. However, the automatic focusing mechanism suffers limitations because its principles are based on moving the focal point of the focusing optical system. In addition, the automatic focusing mechanism lacks reliability as it is unable to handle a plurality of light beams.

SUMMARY OF THE INVENTION

It is a general object of the present invention to provide an image recording apparatus which is of a relatively inexpensive construction and is capable of focusing a light beam from a light source highly accurately onto a recording medium so as to record a highly accurate image thereon regardless of positional fluctuations of the recording medium.

A principal object of the present invention is to provide an image recording apparatus which is capable of generating a plurality of focused positions of a light beam substantially symmetrically in front of and behind a recording medium for thereby virtually increasing the depth of focus.

Another object of the present invention is to provide an image recording apparatus which is capable of suppressing density variations of an area-modulated image regardless of intensity fluctuations of a light beam and positional fluctuations of a recording medium.

Still another object of the present invention is to provide an image recording apparatus which is capable of automatically adjusting the distribution of beam intensities at focused positions generated in front of and behind a recording medium.

Yet another object of the present invention is to provide an image recording apparatus which is capable of generating a plurality of focused positions of a light beam in either a main scanning direction or an auxiliary scanning direction with respect to a recording medium, for thereby increasing the depth of focus.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2A is a plan view of the exposure head shown in FIG. 1;

FIG. 2B is a side elevational view of the exposure head shown in FIG. 1;

FIG. 5 is a side elevational view showing refractive characteristics of calcite used as an optical anisotropic element in the laser beam recording apparatus according to the first embodiment;

FIG. 6 is a diagram showing the relationship between a depth of focus and a spot size in the laser beam recording apparatus according to the first embodiment;

FIG. 7 is a diagram showing a beam intensity distribution in the vicinity of a recording medium in the case where two focused positions are generated by the optical anisotropic element in the laser beam recording apparatus according to the first embodiment;

FIG. 8 is a diagram showing a beam intensity distribution in the vicinity of a recording medium in the case where no optical anisotropic element is employed, the view showing an example for comparison with the inventive example shown in FIG. 7;

FIG. 9 is a diagram of integrated intensities in the auxiliary scanning direction of laser beams on a recording medium which are produced by semiconductor lasers according to first through fourth embodiments;

FIG. 15A is a plan view of an exposure head in a laser beam recording apparatus according to a fourth embodiment of the present invention;

FIG. 15B is a side elevational view of the exposure head shown in FIG. 15A;

FIG. 16 is a diagram showing a beam intensity distribution in the vicinity of a recording medium in the case where two focused positions are generated by the optical anisotropic element in the laser beam recording apparatus according to the fourth embodiment;

FIG. 17 is a diagram showing a beam intensity distribution in the vicinity of a recording medium in the case where two focused positions are generated by the optical anisotropic element in the laser beam recording apparatus according to the fourth embodiment;

FIG. 18 is a diagram showing a beam intensity distribution in the vicinity of a recording medium in the case where two focused positions are generated by the optical anisotropic element in the laser beam recording apparatus according to the fourth embodiment;

DESCRIPTION OF THE PREFERRED EMBODIMENTS

1st Embodiment:

FIGS. 1, 2A, 2B, and 3 show a laser beam recording apparatus as an image recording apparatus according to a first embodiment of the present invention.

The laser beam recording apparatus 10 is arranged such that a laser beam L emitted from an exposure head 12 is applied to a sensitive recording medium F, which may be a photosensitive recording medium, for example, wound around a drum 14 to record an area-modulated image on the sensitive recording medium F.

When the drum 14 is rotated about its own axis in a main scanning direction indicated by the arrow X and the exposure head 12 moves in an auxiliary scanning direction indicated by the arrow Y, a two-dimensional image is formed on the sensitive recording medium F. The area-modulated image is an image made up of a plurality of pixels that are formed on the sensitive recording medium F by turning on and off the laser beam L, the image having a desired gradation achieved by the area occupied by the pixels thus formed.

The exposure head 12 has a semiconductor laser LD for emitting the laser beam L and a focusing optical system 16 for generating the image of a near-field pattern of the laser beam L on the sensitive recording medium F.

Figure 1:
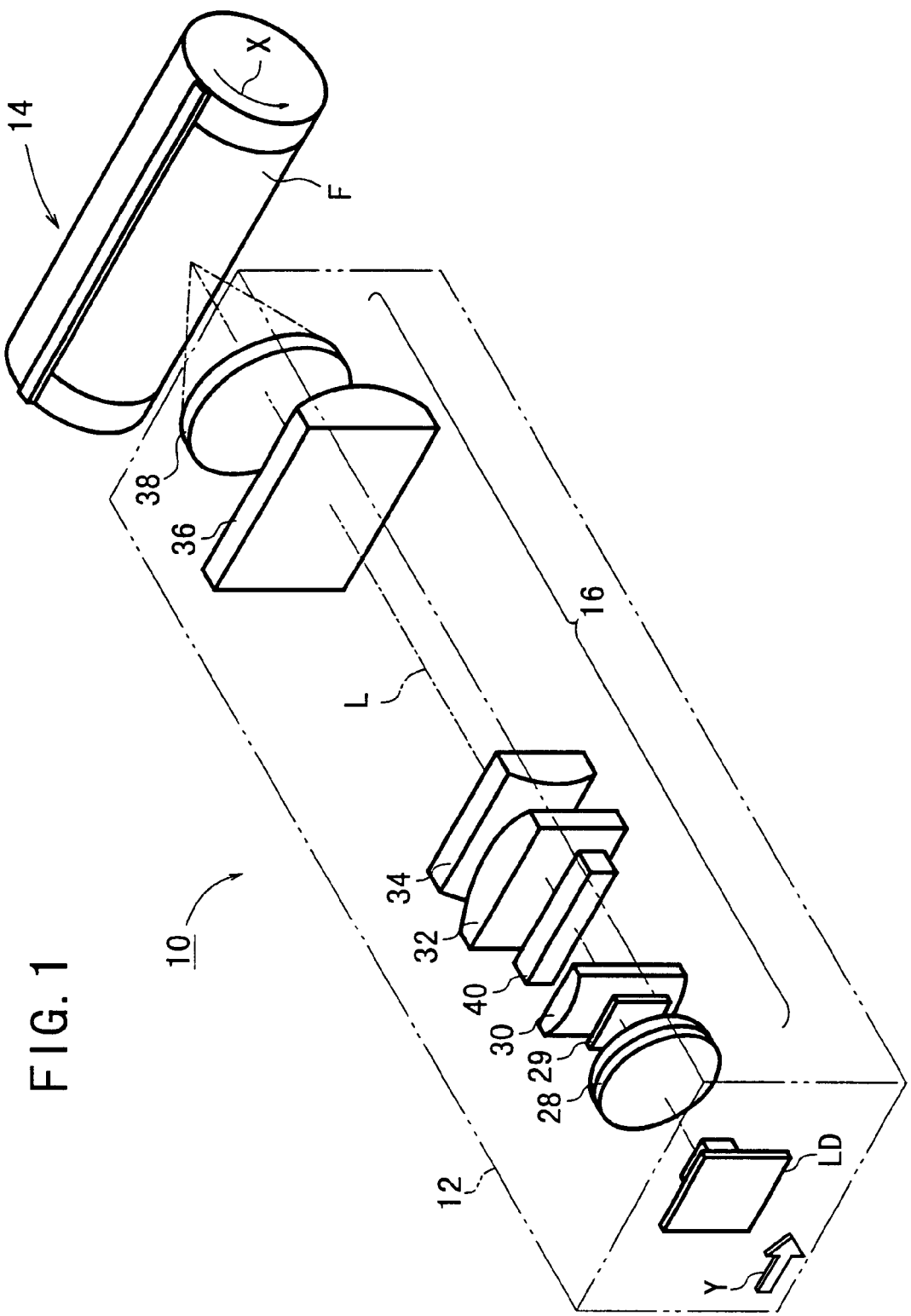
FIG. 1 is a perspective view of an exposure head of a laser beam recording apparatus according to a first embodiment of the present invention.
Figure 3:
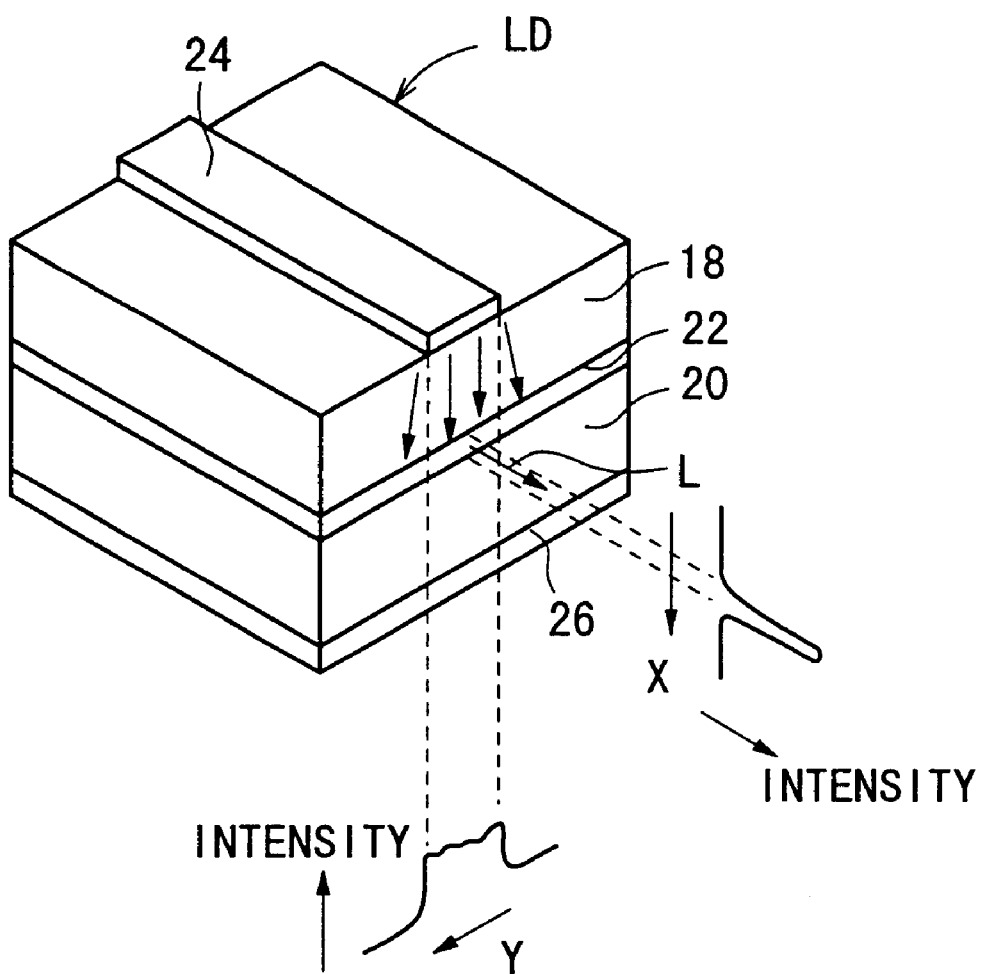
FIG. 3 is a perspective view of a semiconductor laser of the laser beam recording apparatus shown in FIG. 1.

The semiconductor laser LD comprises an index-guided broad-area semiconductor laser. Basically, as shown in FIG. 3, the semiconductor laser LD has a p-type semiconductor substrate 18, an n-type semiconductor substrate 20, an active layer 22 interposed between the semiconductor substrates 18, 20, and electrodes 24, 26 disposed respectively on the semiconductor substrates 18, 20. When a predetermined voltage is applied between the electrodes 24, 26, a laser beam L is emitted from the active layer 22.

The electrode 24 has a limited width to control the refractive index along the active layer 22 in a region thereof corresponding to the limited width. The laser beam L emitted from the semiconductor laser LD has an emission intensity pattern that, as shown in FIG. 3, is of a wide, substantially square shape along the joined surface of the active layer 22, which is commensurate with the width of the electrode 24, and is of a narrow shape along the thickness of the active layer 22, which is commensurate with the thickness of the active layer 22.

As shown in FIGS. 2A and 2B, the focusing optical system 16 is an optical system for forming the image of a near-field pattern of the laser beam L emitted from the semiconductor laser LD on the sensitive recording medium F. The focusing optical system 16 comprises a collimator lens 28, a half-wave plate 29, a plurality of cylindrical lenses 30, 32, 34, 36, and a condenser lens 38 arranged in the order named successively from the semiconductor laser LD.

The cylindrical lenses 30, 32 serve to converge the laser beam L only in the auxiliary scanning direction indicated by the arrow Y, and the cylindrical lenses 34, 36 serve to converge the laser beam L only in the main scanning direction indicated by the arrow X.

The focusing optical system 16 also includes an optical anisotropic element (a plural-focused-positions generating means) 40 disposed between the cylindrical lens 30 and the cylindrical lens 32.

The optical anisotropic element 40 is made of a uniaxial crystal of lithium niobate (LN), quartz, calcite, or the like. In the first embodiment, the optical anisotropic element 40 is made of calcite.

The optical anisotropic element 40 is provided to provide two focused positions to only one of two components of the laser beam L which are perpendicular to each other in respective planes that are substantially normal to the optical axis of the laser beam L. As a consequence, as shown in FIGS. 2A and 2B, the optical anisotropic element 40 is placed in such a position as to diverge the laser beam in the auxiliary scanning direction and pass the laser beam as a parallel-ray beam in the main scanning direction.

Figure 4:
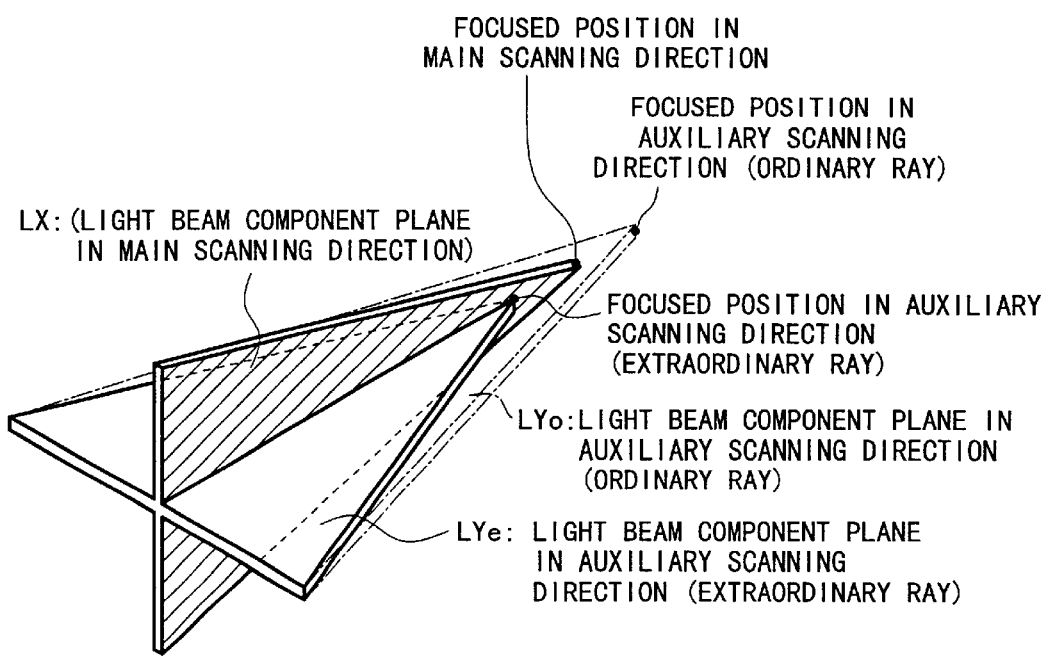
FIG. 4 is a diagram of light beam components showing focused positions thereof in main and auxiliary scanning directions in the laser beam recording apparatus according to the first embodiment.

Therefore, since the optical anisotropic element 40 does not affect the laser beam component in the main scanning direction, the laser beam L has a single focused position in the main scanning direction (see a light beam component plane LX in the main scanning direction in FIG. 4).

The laser beam component in the auxiliary scanning direction is applied to an entrance side of the optical anisotropic element 40 at a certain angle (divergent). Because ordinary light and extraordinary rays of the divergent laser beam component travel according to respective different refractive indexes, the divergent laser beam component is focused at two different focused positions along the optical axis by the condenser lens 38, as can be seen from light beam component planes LYo, LYe in the auxiliary scanning direction in FIG. 4.

In the first embodiment, the optical anisotropic element 40 of calcite has an optical axis extending perpendicularly to the sheet of FIG. 5 (see the symbol ⊗ in FIG. 5). Therefore, the extraordinary ray that has passed through the optical anisotropic element 40 is focused at a position in front of the outer circumferential surface of the drum 14, i.e., spaced from the outer circumferential surface of the drum 14 toward the semiconductor laser LD, and the ordinary ray that has passed through the optical anisotropic element 40 is focused at a position behind the outer circumferential surface of the drum 14, i.e., spaced from the outer circumferential surface of the drum 14 toward the central axis of the drum 14.

Operation of the laser beam recording apparatus 10 according to the first embodiment will be described below.

The laser beam L which has been modulated by image information and emitted from the active layer 22 of the semiconductor laser LD is applied to the collimator lens 28 which converts the near-field pattern of the laser beam L into a parallel-ray beam. The laser beam L then passes through the half-wave plate 29 and is shaped by the cylindrical lenses 30, 32 only in the auxiliary scanning direction indicated by the arrow Y. The cylindrical lenses 34, 36 shape the laser beam L only in the main scanning direction indicated by the arrow X. The laser beam L is focused by the condenser lens 38 to form the image of the near-field pattern of the laser beam L on the sensitive recording medium F supported on the drum 14. The laser beam L is refracted with two different refractive indexes by the optical anisotropic element 40 disposed between the cylindrical lenses 30, 32, and focused at two focused positions near the sensitive recording medium F.

Since the optical anisotropic element 40 of calcite is positioned in the laser beam component which diverges only in the auxiliary scanning direction, as shown in FIGS. 2A and 2B, the laser beam L which is divergent in the auxiliary scanning direction is affected by the optical anisotropic element 40. The laser beam L in the main scanning direction is a parallel-ray beam and is applied perpendicularly to the entrance surface of the optical anisotropic element 40 and leaves the optical anisotropic element 40 along a straight path therefrom.

Inasmuch as the optical anisotropic element 40 of calcite has its optical axis extending perpendicularly to the sheet of FIG. 5 (see the symbol ⊗ in FIG. 5), it provides different refractive indexes for the ordinary and extraordinary rays of the laser beam L which is divergent in the auxiliary scanning direction. The refractive index for the ordinary ray is greater than the refractive index for the extraordinary ray.

These refractive indexes for the ordinary and extraordinary rays are expressed by the following equations:

$$\sin\theta in = no \cdot \sin\theta out(0) \quad (1)$$

$$\sin\theta in = ne \cdot \sin\theta out(e) \quad (2)$$

where sinθin: the angle of incidence of the laser beam L on the optical anisotropic element 40;

no: the refractive index for the ordinary ray;

ne: the refractive index for the extraordinary ray;

sinθout(0): the angle of the refracted ordinary ray; and sinθout(e): the angle of the refracted extraordinary ray.

Since the refractive indexes for the ordinary and extraordinary rays are different from each other, the focused positions of the ordinary and extraordinary rays are different from each other along the optical axis. Specifically, the extraordinary ray is focused at a position (see the position h in FIG. 13) in front of the outer circumferential surface of the drum 14 along the optical axis, and the ordinary ray is focused at a position (see the position g in FIG. 13) behind the outer circumferential surface of the drum 14 along the optical axis.

As shown in FIG. 5, the distance ΔL between the two focused positions is approximately determined as follows:

$$|\Delta L| \approx t \cdot \{(1/no) - 1(1/ne)\} \cdot m^2 \quad (3)$$

where t represents the thickness of the optical anisotropic element 40 along the optical axis, and no and ne represent the respective refractive indexes for the ordinary and extraordinary rays.

In the first embodiment, the thickness t is set to t=6.91 mm, m is set to m=0.29 (m: the lateral magnification between entrance and exit sides shown in FIG. 5), and the distance ΔL between the two focused positions is set to ΔL=40 μm. As a result, the laser beam L emitted from the semiconductor laser LD has a sufficient level required of intensity and an increased depth of focus as can be seen from FIG. 6 which shows the relationship between a depth of focus and a spot size. To substantiate the sufficient level required of intensity, FIG. 7 shows a distribution of beam intensities at respective positions that are spaced ΔZ along the optical axis from a focused position Z on the sensitive recording medium F supported on the drum 14. FIG. 8 shows a comparative example of a distribution of beam intensities at respective positions with no optical anisotropic element 40 being employed.

A study of FIG. 8 indicates that with no optical anisotropic element 40 being employed, if the focused position is displaced only ΔZ=20 μm, then the curve of the beam intensity distribution has a much smaller gradient, resulting in an out-of-focus image formed on the sensitive recording medium F due to a lack of beam intensity.

With the optical anisotropic element 40 being employed, as shown in FIG. 7, even at the position spaced ΔZ=40 μm, for example, the beam intensity suffers a smaller changes than if no optical anisotropic element 40 is employed. Accordingly, any out-of-focus state of the image formed on the sensitive recording medium F is much smaller even when the sensitive recording medium F is positionally displaced along the optical axis due to the drum 14 having its outer circumferential surface not concentric with its axis.

According to the first embodiment of the present invention, as described above, the optical anisotropic element 40 is used to increase the depth of focus for minimizing an out-of-focus state resulting from the displacement of the sensitive recording medium F along the optical axis. Additionally, in view of the beam intensity within the depth of focus, the optical anisotropic element 40 is placed in the path of the laser beam L which converges or diverges only in one of the main and auxiliary scanning directions, and based on the position and thickness of the optical anisotropic element 40 and the refractive indexes no, ne for the ordinary and extraordinary rays, the depth of focus is established so as to extend uniformly in front of and behind the normal position of the sensitive recording medium F. Consequently, the depth of focus can efficiently be increased while maintaining a sufficient level required of beam intensity.

If the sensitive recording medium F comprises a thermosensitive recording medium, then an image is recorded thereon by thermal energy converted from optical energy of the laser beam L. As shown in FIG. 7, if a coloring threshold of the sensitive recording medium F is in the vicinity of a half value of a beam intensity distribution, then a more accurate image can be formed on the sensitive recording medium F because fluctuations of the width of the image in the auxiliary scanning direction due to the displacement of the focused position on the sensitive recording medium F are small.

Moreover, as shown in FIG. 3, the laser beam L emitted from the semiconductor laser LD is of a near-field pattern which is substantially of a square shape in the auxiliary scanning direction indicated by the arrow Y. Even if the energy of the laser beam L is integrated in the main scanning direction indicated by the arrow X on the sensitive recording medium F, the integrated intensity in the auxiliary scanning direction will not be of a Gaussian distribution. Therefore, as shown in FIG. 9, even if the intensity of the laser beam L varies, resulting in a change in the integrated intensity as indicated by the curves A, B, a coloring range c determined by the coloring threshold of the sensitive recording medium F does not vary for thereby further suppressing density variations of the image in the auxiliary scanning direction.

2nd Embodiment:

An image recording apparatus according to a second embodiment of the present invention will be described below. Those parts of the image recording apparatus according to the second embodiment which are identical to those of the image recording apparatus according to the first embodiment are denoted by identical reference characters, and will not be described in detail below.

In the second embodiment, an optical anisotropic element as a plural-focused-positions generating means is disposed in each of the path of a laser beam which diverges or converges in the main scanning direction and the path of a laser beam which diverges or converges in the auxiliary scanning direction.

Figure 10A:
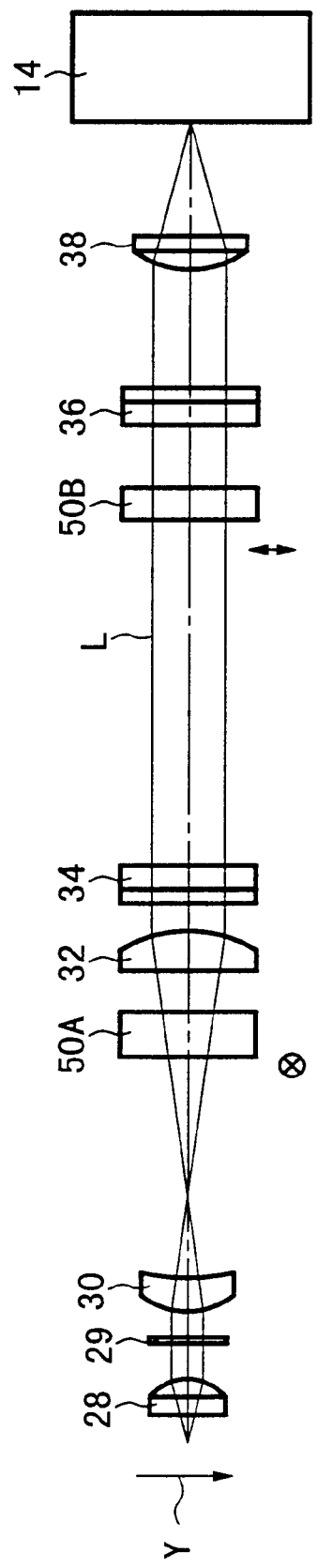
FIG. 10A is a plan view of an exposure head in a laser beam recording apparatus according to a second embodiment of the present invention.
Figure 10B:
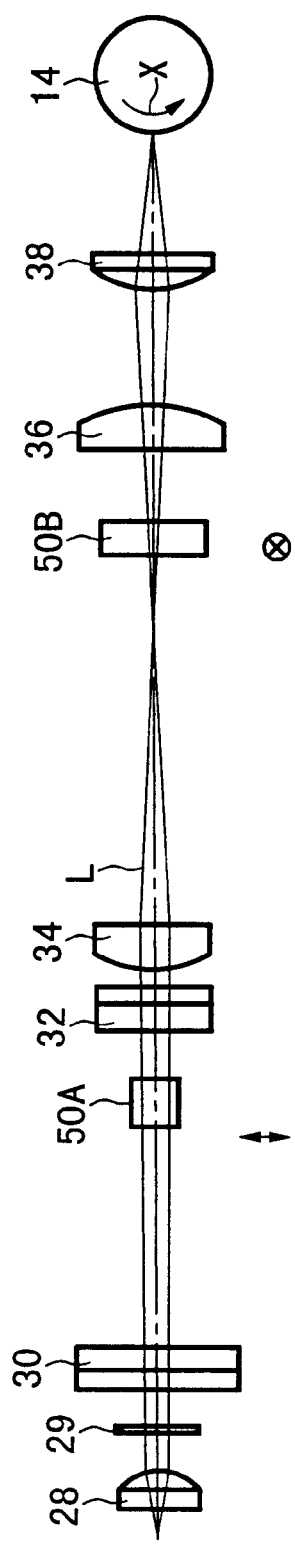
FIG. 10B is a side elevational view of the exposure head shown in FIG. 10A.

FIGS. 10A and 10B show an exposure head in the laser beam recording apparatus according to the second embodiment of the present invention. The exposure head includes a first optical anisotropic element 50A and a second optical anisotropic element 50B, each made of calcite, which are positioned in the path of the laser beam.

The first optical anisotropic element 50A is disposed in the same position as the optical anisotropic element 40 according to the first embodiment. Specifically, the laser beam L is diverged only in the auxiliary scanning direction by the first optical anisotropic element 50A, and the first optical anisotropic element 50A does not affect the laser beam L in the main scanning direction. The first optical anisotropic element 50A of calcite has an optical axis extending perpendicularly to the sheet of FIG. 10A (see the symbol $\bigodot$). As a consequence, the extraordinary ray that has passed through the first optical anisotropic element 50A is focused at a position (see the position h in FIG. 13) in front of the normal position on the sensitive recording medium i.e., spaced from the outer circumferential surface of the drum 14 toward the semiconductor laser LD, and the ordinary ray that has passed through the first optical anisotropic element 50A is focused at a position (see the position g in FIG. 13) behind the normal position on the sensitive recording medium F, i.e., spaced from the outer circumferential surface of the drum 14 toward the central axis of the drum 14.

The second optical anisotropic element 50B is disposed in the path between the cylindrical lens 34 and the cylindrical lens 36. In the position of the second optical anisotropic element 50B, the laser beam L in the auxiliary scanning direction is a parallel-ray beam, and the laser beam L in the main scanning direction is a divergent beam.

Therefore, the second optical anisotropic element 50B affects only the laser beam L in the main scanning direction, and does not affect the laser beam L in the auxiliary scanning direction.

The second optical anisotropic element 50B is made of the same calcite as the calcite of the first optical anisotropic element 50A. However, the optical axis of the second optical anisotropic element 50B is angularly spaced 90° around the optical axis from the optical axis of the first optical anisotropic element 50A, as indicated by the symbol $\bigotimes$ in FIG. 10B. Thus, the incident beam to and the optical axis of the second optical anisotropic element 50B are related to each other in the same fashion as with the first optical anisotropic element 50A. As a consequence, the extraordinary ray that has passed through the second optical anisotropic element 50B is focused at a position (see the position h in FIG. 13) in front of the normal position on the sensitive recording medium F, i.e., spaced from the outer circumferential surface of the drum 14 toward the semiconductor laser LD, and the ordinary ray that has passed through the second optical anisotropic element 50B is focused at a position (see the position g in FIG. 13) behind the normal position on the sensitive recording medium F, i.e., spaced from the outer circumferential surface of the drum 14 toward the central axis of the drum 14.

The thicknesses t of the first and second optical anisotropic elements 50A, 50B are determined on the basis of their incident angles, such that the distance between the two focused positions produced by the first optical anisotropic element 50A is the same as the distance between the two focused positions produced by the second optical anisotropic element 50B. In the second embodiment, the first optical anisotropic element 50A of calcite has a thickness t1 of 6.91 mm, and the second optical anisotropic element 50B of calcite has a thickness t2 of 1.73 mm. The lateral magnification m provided in the main scanning direction by the cylindrical lens 36 and the condenser lens 38 is 0.58.

Figure 13:
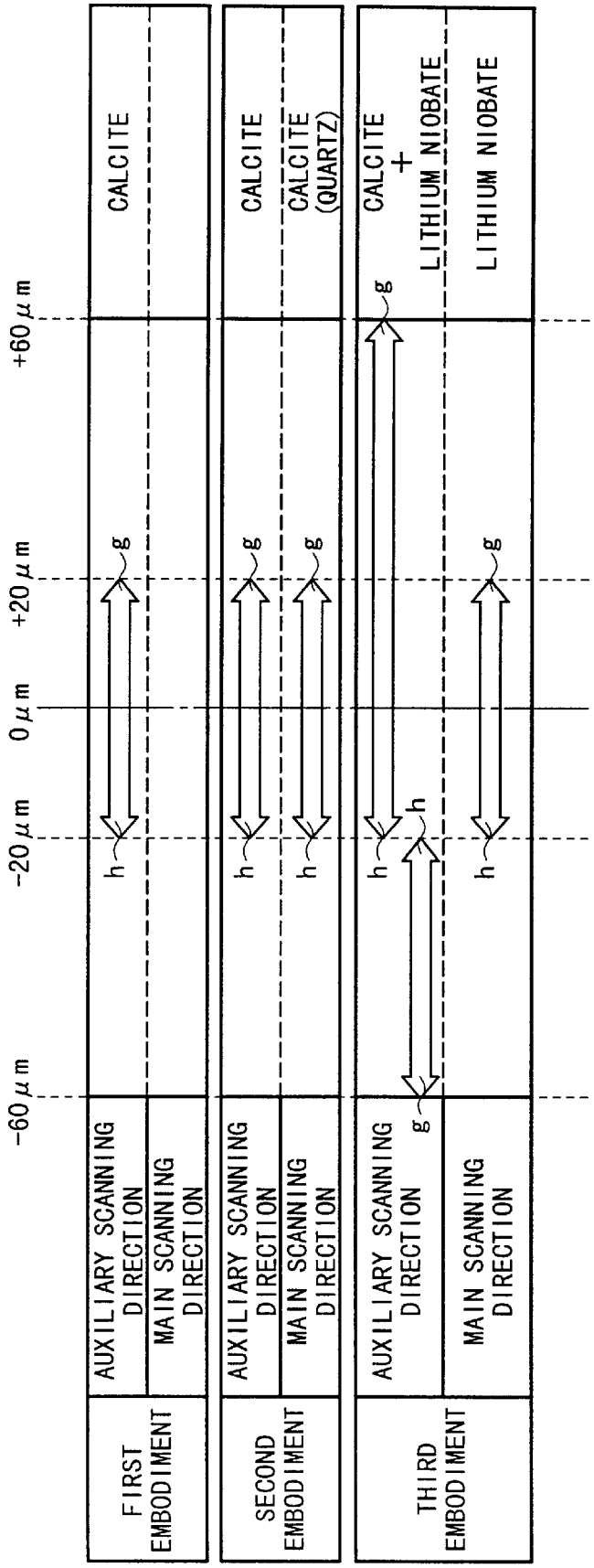
FIG. 13 is a diagram showing the positional relationship between the optical anisotropic elements according to the first through third embodiments and two focused positions generated by the optical anisotropic elements.

With the first and second optical anisotropic elements 50A, 50B being thus located in the respective beam paths, it is possible to form two focused positions respectively at the positions of −20 $\mu$m, +20 $\mu$m in both the main and auxiliary scanning directions, as shown in FIG. 13. The laser beam L emitted from the semiconductor laser LD has a sufficient level required of intensity on the sensitive recording medium F.

In the second embodiment, each of the first and second optical anisotropic elements 50A, 50B is made of calcite having the same optical characteristics. However, the first and second optical anisotropic elements may be made of a negative uniaxial crystal and a positive uniaxial crystal, respectively.

Figure 11A:
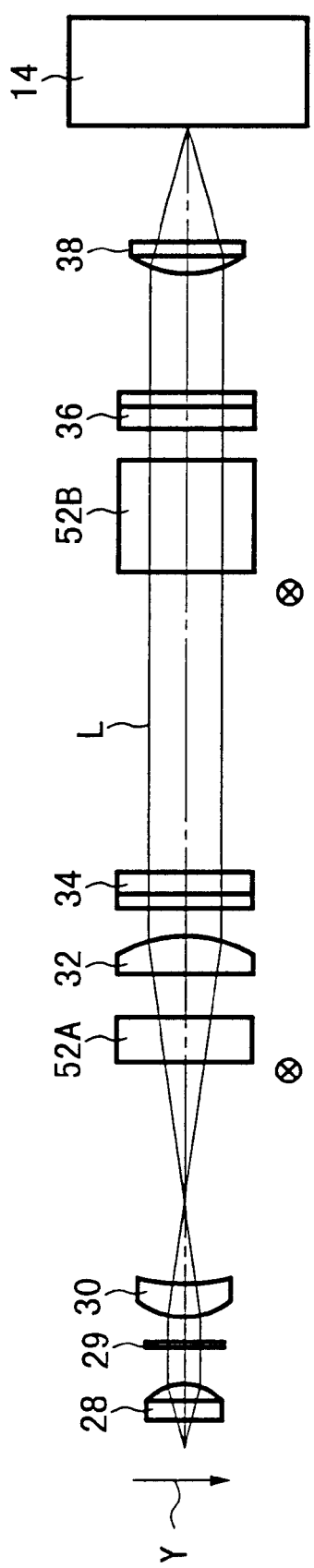
FIG. 11A is a plan view of an exposure head which employs a second optical anisotropic element of quartz, rather than a second optical anisotropic element of calcite according to the second embodiment.
Figure 11B:
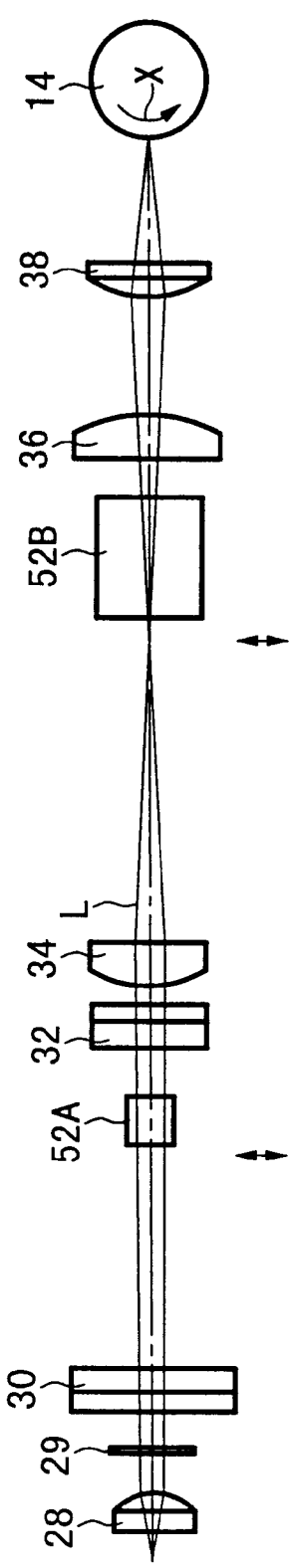
FIG. 11B is a side elevational view of the exposure head shown in FIG. 11A.

Specifically, as shown in FIGS. 11A and 11B, a first optical anisotropic element 52A disposed between the cylindrical lens 30 and the cylindrical lens 32 is made of calcite, which is a negative uniaxial crystal, and a second optical anisotropic element 52B disposed between the cylindrical lens 34 and the cylindrical lens 36 is made of quartz, which is a positive uniaxial crystal. The first optical anisotropic element 52A and the second optical anisotropic element 52B have respective optical axes oriented in the same direction. The first and second optical anisotropic elements 52A, 52B, as plural-focused-positions generating means, thus arranged are also effective to increase the depth of focus.

3rd Embodiment:

An image recording apparatus according to a third embodiment of the present invention will be described below. Those parts of the image recording apparatus according to the third embodiment which are identical to those of the image recording apparatus according to the first embodiment are denoted by identical reference characters, and will not be described in detail below.

In the third embodiment, optical anisotropic elements It as different plural-focused-positions generating means are disposed respectively in the path of a laser beam which diverges or converges in one of the main and auxiliary scanning directions and the path of a laser beam which converges in both the main and auxiliary scanning directions.

Figure 12A:
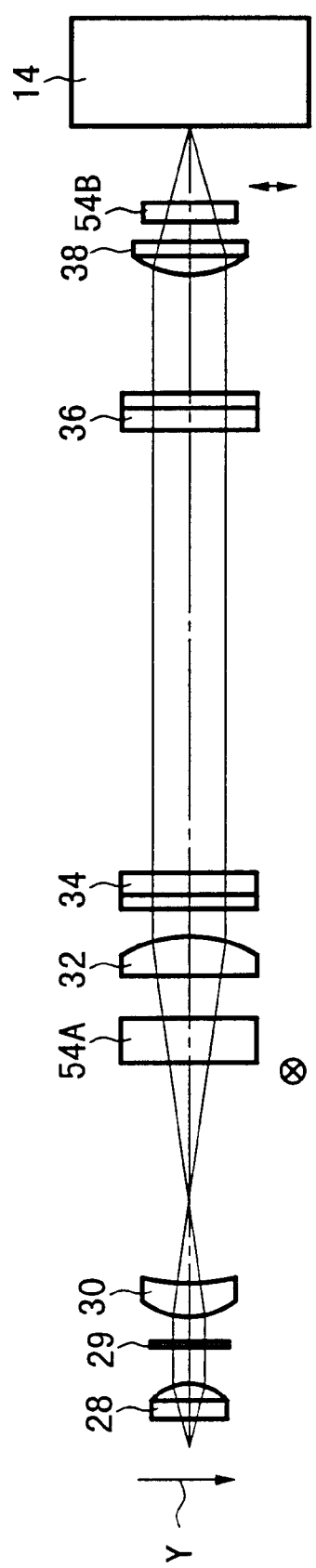
FIG. 12A is a plan view of an exposure head in a laser beam recording apparatus according to a third embodiment of the present invention.
Figure 12B:
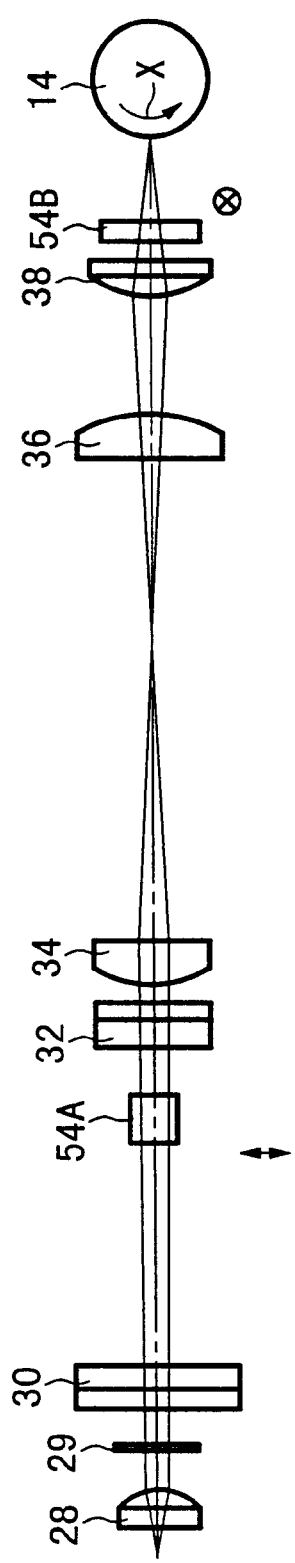
FIG. 12B is a side elevational view of the exposure head shown in FIG. 12A.

FIGS. 12A and 12B show an exposure head in the laser beam recording apparatus according to the third embodiment of the present invention. The exposure head includes a first optical anisotropic element 54A made of calcite and a second optical anisotropic element 54B made of lithium niobate.

The first optical anisotropic element 54A is disposed in the same position as the optical anisotropic element 40 according to the first embodiment. Specifically, the laser beam L is diverged only in the auxiliary scanning direction by the first optical anisotropic element 54A, and the first optical anisotropic element 50A does not affect the laser beam L in the main scanning direction. The first optical anisotropic element 54A of calcite has an optical axis extending perpendicularly to the sheet of FIG. 12A (see the symbol ⓧ). As a consequence, the extraordinary ray that has passed through the first optical anisotropic element 54A is focused at a position (see the position h in FIG. 13) in front of the normal position on the sensitive recording medium F, i.e., spaced from the outer circumferential surface of the drum 14 toward the semiconductor laser LD, and the ordinary ray that has passed through the first optical anisotropic element 54A is focused at a position (see the position g in FIG. 13) behind the normal position on the sensitive recording medium F. i.e., spaced from the outer circumferential surface of the drum 14 toward the central axis of the drum 14.

The second optical anisotropic element 54B is disposed between the condenser lens 38 and the drum 14. The second optical anisotropic element 54B thus affects, i.e., refracts, the laser beam L in both the main and auxiliary scanning directions.

The second optical anisotropic element 54B of lithium niobate has an optical axis extending perpendicularly to the sheet of FIG. 12B (see the symbol ⓧ). Since lithium niobate has a refractive index different from the refractive index of calcite and the same sign as the calcite, i.e., a negative uniaxial crystal, the second optical anisotropic element 54B of lithium niobate produces a focused position (see the position h in FIG. 13) for an ordinary ray closely to the condenser lens 38 and a focused position (see the position g in FIG. 13) for an extraordinary ray remotely from the condenser lens 38 with respect to the laser beam in the auxiliary scanning direction. The two focused positions thus produced on the basis of the position and thickness of the second optical anisotropic element 54B of lithium niobate are located in front of the normal position on the sensitive recording medium F (see FIG. 13).

The second optical anisotropic element 54B is capable of refracting the laser beam L in the main scanning direction, as well as the auxiliary scanning direction, to focus the laser beam L at two focused positions.

Specifically, inasmuch as the second optical anisotropic element 54B of lithium niobate has an optical axis extending perpendicularly to the sheet of FIG. 12B (see the symbol ⓧ), the extraordinary ray that has passed through the second optical anisotropic element 54B is focused at a position (see the position h in FIG. 13) in front of the normal position on the sensitive recording medium F, and the ordinary ray that has passed through the second optical anisotropic element 54B is focused at a position (see the position g in FIG. 13) behind the normal position on the sensitive recording medium F.

In the third embodiment, the focused positions of the laser beam in the auxiliary scanning direction are adjusted by the two optical anisotropic elements, i.e., the first optical anisotropic element 54A and the second optical anisotropic element 54B. As a result, as shown in FIG. 13, the focused positions for the laser beam in the auxiliary scanning direction are generated in front of and behind the sensitive recording medium F. The two focused positions for the laser beam in the main scanning direction are generated only by the second optical anisotropic element 54B.

More specifically, in the absence of lithium niobate, there are two focused positions produced at an interval of 80 $\mu$m in the auxiliary scanning direction. With lithium niobate inserted, the extraordinary ray is focused at a position close to the condenser lens 38, and the ordinary ray is focused at a position remote from the condenser lens 38. These focused positions are spaced from each other by about 40 $\mu$m.

The above combination of the optical anisotropic elements allows two focused positions to be formed in the auxiliary scanning directions at positions equivalent to those in the main scanning direction.

According to the third embodiment, two or more optical anisotropic elements may be employed to positionally adjust the two focused positions which are produced. This principle may be applied to a situation where necessary optical anisotropic elements cannot be disposed in all required positions on beam paths, because a plurality of optical anisotropic elements may be disposed on only available beam paths and combined to provide desired focused positions.

In the third embodiment, the first optical anisotropic element 54A of calcite has a thickness t1 of 13.82 mm, and the second optical anisotropic element 54B of lithium niobate has a thickness t2 of 2.4 mm. The lateral magnification m provided in the auxiliary scanning direction by the cylindrical lens 32 and the condenser lens 38 is 0.29.

In the first through third embodiments, the half-wave plate 29 is disposed between the collimator lens 28 and the cylindrical lens 30, and has an optical axis tilted 22.5° clockwise from the auxiliary scanning direction as viewed from the semiconductor laser LD. The half-wave plate 29 thus positioned and oriented converts the laser beam L emitted from the semiconductor laser LD into a linearly polarized beam that is rotated 45° with respect to the auxiliary scanning direction, allowing the generated two focused positions for the ordinary and extraordinary rays to be used as recording spots with the same beam intensity. However, in the second and third embodiments shown in FIGS. 10A, 10B, 11A, 11B, 12A, and 12B, since the two optical anisotropic elements are employed, the relative angle between the half-wave plate 29 and the optical anisotropic elements may possibly be slightly different in view of the accuracy of the position of the optical anisotropic elements.

Figure 14A:
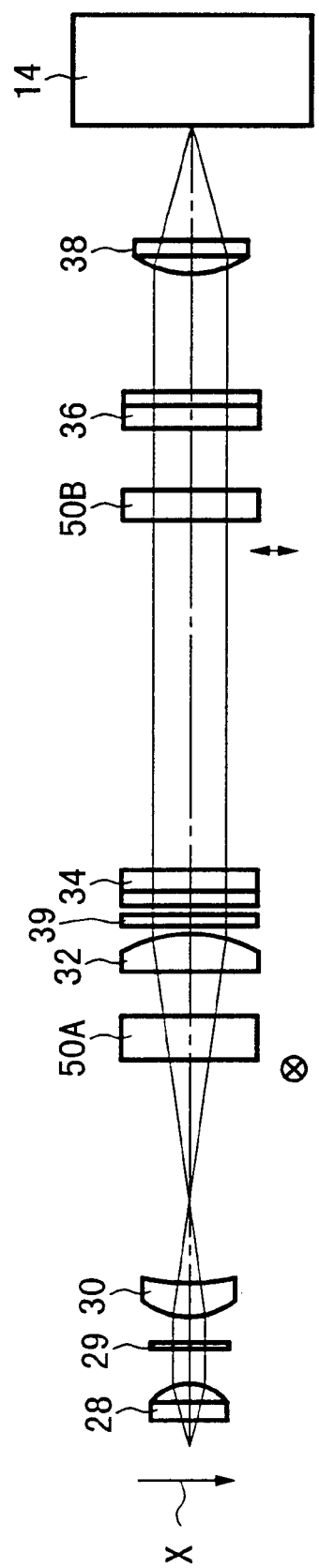
FIG. 14A is a plan view of an exposure head which has a half-wave plate or a quarter-wave plate disposed between first and second optical anisotropic elements in the second embodiment.
Figure 14B:
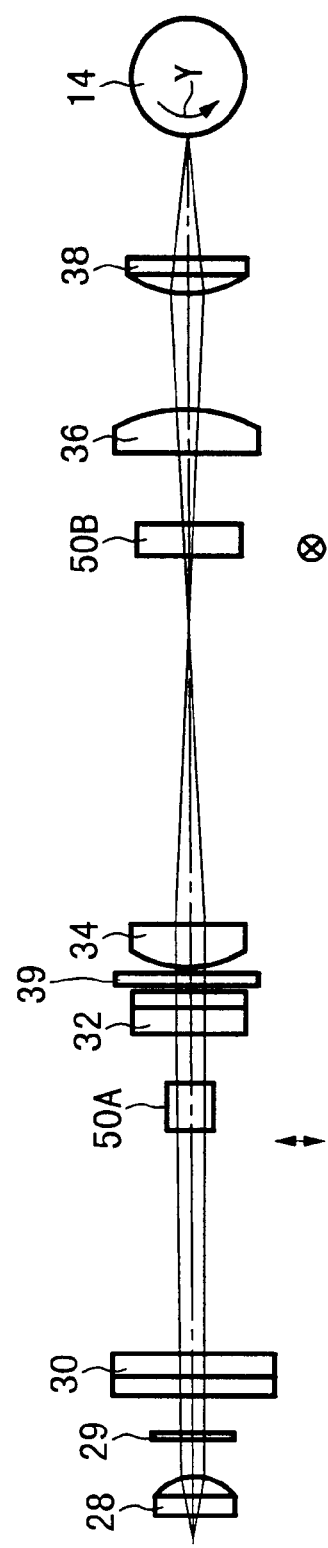
FIG. 14B is a side elevational view of the exposure head shown in FIG. 14A.

To eliminate the above drawback, as shown in FIGS. 14A and 14B, a half-wave plate 29 or a quarter-wave plate is disposed in front of the first optical anisotropic element 50A, and a half-wave plate 39 or a quarter-wave plate is disposed between the first optical anisotropic element 50A and the second optical anisotropic element 50B, for individually adjusting the beam intensities at the focused positions generated by the first optical anisotropic element 50A and the second optical anisotropic element 50B. For example, the half-wave plate 39 or the quarter-wave plate disposed in front of the second optical anisotropic element 50B is rotated to adjust the polarized direction of the laser beam L for adjusting the beam intensity at the focused position for the ordinary ray in the main scanning direction so as to be equal to the beam intensity at the focused position for the extraordinary ray in the main scanning direction. In this manner, a sufficiently extended depth of focus can be achieved.

4th Embodiment:

An image recording apparatus according to a fourth embodiment of the present invention will be described below. Those parts of the image recording apparatus according to the fourth embodiment which are identical to those of the image recording apparatus according to the first embodiment are denoted by identical reference characters, and will not be described in detail below.

In the fourth embodiment, an optical anisotropic element as a plural-focused-positions generating means is disposed in the path of a laser beam which diverges or converges in both the main and auxiliary scanning directions.

FIGS. 15A and 15B show an exposure head in the laser beam recording apparatus according to the fourth embodiment of the present invention. The exposure head shown in FIGS. 15A and 15B includes an optical anisotropic element 56 made of a uniaxial crystal of calcite, lithium niobate, quartz, or the like as a plural-focused-positions generating means. The optical anisotropic element 56 is disposed between the condenser lens 38 and the drum 14, and has an optical axis extending perpendicularly to the sheet of FIG. 15B (see the symbol ⓧ in FIG. 15B). The polarized direction of the laser beam L is selected to distribute the beam intensity uniformly between two axes perpendicular to each other within planes in the optical anisotropic element 56 that are normal to the optical axis.

The laser beam L that has passed through the condenser lens 38 is separated into two linearly polarized beams by the optical anisotropic element 56. These beams are refracted according to respective different refractive indexes ne, no so as to be focused at two focused positions with respect to each of the main and auxiliary scanning directions.

The exposure head according to the fourth embodiment differs from the exposure head according to the third embodiment in that the exposure head according to the fourth embodiment lacks the first optical anisotropic element 54A in the exposure head according to the third embodiment. Therefore, the exposure head according to the fourth embodiment forms focused positions at different positions in the main and auxiliary scanning directions, as indicated by the arrangement where only lithium niobate is used in FIG. 13.

The laser beam L emitted from the semiconductor laser LD used in the third embodiment has a substantially square-shaped intensity distribution with respect to the auxiliary scanning direction and comprises a good coherent beam with respect to the main scanning direction, as shown in FIG. 3. Therefore, if the laser beam L has equal full widths at half maximum on the sensitive recording medium F in the main and auxiliary scanning directions, then the laser beam L may be regarded as having a sufficient depth of focus in the main scanning direction as compared with the auxiliary scanning direction. Stated otherwise, even if the focused position is displaced in the main scanning direction, an out-of-focus state in the main scanning direction can be ignored with respect to a depth of focus to be obtained in the auxiliary scanning direction.

By setting the center between the two focused positions in the auxiliary scanning direction to the normal position on the sensitive recording medium F mounted on the drum 14, it is possible to provide a sufficient depth of focus in the auxiliary scanning direction. The distance $\Delta L$ between the two focused positions can be determined by the above equation (3).

If the depth of focus in the main scanning direction can be increased, then it is not necessary to limit the beam shape in the auxiliary scanning direction of the laser beam L emitted from the semiconductor laser LD to the square shape.

The relationship represented by the equation (3) is derived on the assumption that the two focused positions are in accord with the Snell's law. If the direction of the refractive index no and the direction of the refractive index ne within the plane of incidence on the optical anisotropic element 56 are 90° different from the above direction, one of the beams becomes an extraordinary ray which does not comply with the Snell's law. In this case, the equations (1) and (2) are not satisfied, but the laser beam L can be focused at two different positions that are spaced a certain distance from each other along the optical axis.

FIGS. 16 through 18 show intensity distributions of the laser beam L at the time the central points between the two focused positions generated by the optical anisotropic element 56 and spaced from each other by distances $\Delta L=20\,\mu m$, 30 $\mu m$, 52 $\mu m$ are spaced from the sensitive recording medium F by distances $\Delta Z=0\,\mu m$, 20 $\mu m$, 40 $\mu m$, and 50 $\mu m$.

A comparison between the beam intensity distributions shown in FIGS. 16 through 18 and the beam intensity distribution shown in FIG. 8 where no optical anisotropic element is employed reveals that if the distance $\Delta L$ between the two focused positions is 20 $\mu m$, then the change in the intensity distribution of the laser beam L is smaller than the change in the intensity distribution of the laser beam L shown in FIG. 8, as shown in FIG. 16, and if the distance $\Delta L$ between the two focused positions is 52 $\mu m$, then the change in the intensity distribution of the laser beam L is much smaller than the change in the intensity distribution of the laser beam L shown in FIG. 8, as shown in FIG. 18. Therefore, an out-of-focus state of the formed image due to a positional displacement of the sensitive recording medium F is appropriately suppressed.

When the polarized direction of the laser beam L is substantially equalized with respect to two axes perpendicular to each other within planes that are normal to the optical axis, the intensities of the laser beam L at the focused positions can be substantially equalized to each other for thereby further suppressing an intensity fluctuation due to a positional displacement of the sensitive recording medium F. In order to substantially equalize the polarized direction of the laser beam L with respect to the two axes, if the laser beam L emitted from the semiconductor laser LD is a linearly polarized beam, then the two axes may be tilted 45° with respect to the direction of the linearly polarized beam.

Figure 19A:
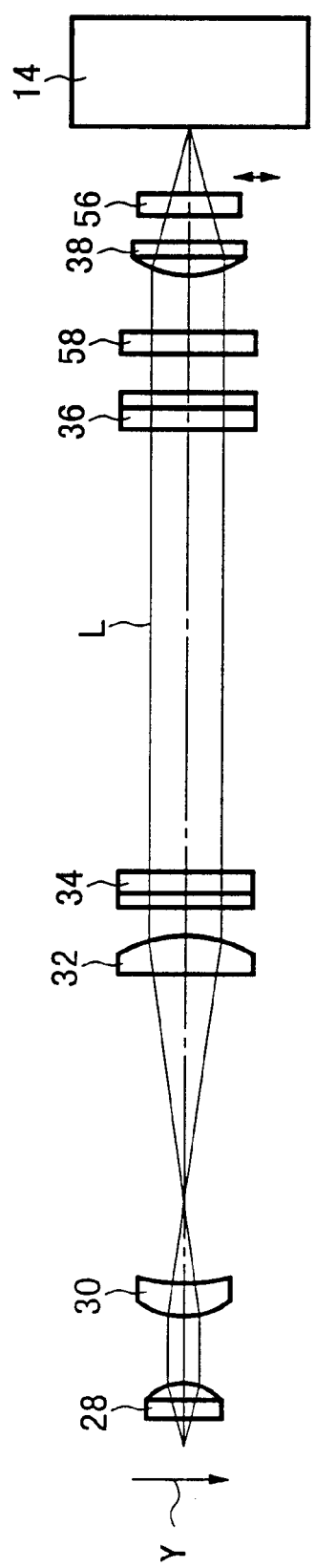
FIG. 19A is a plan view of an exposure head which has a half-wave plate or a quarter-wave plate disposed in front of the optical anisotropic element in the laser beam recording apparatus according to the fourth embodiment.
Figure 19B:
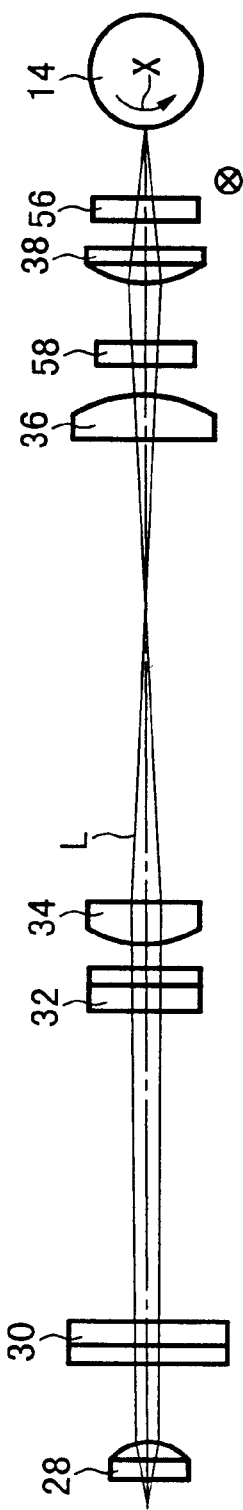
FIG. 19B is a side elevational view of the exposure head shown in FIG. 19A.

As shown in FIGS. 19A and 19B, if a half-wave plate 58 is positioned in front of the optical anisotropic element 56, then the laser beam L applied to the optical anisotropic element 56 can be linearly polarized by the half-wave plate 58. If a quarter-wave plate is positioned in front of the optical anisotropic element 56, then the laser beam L can be circularly polarized, allowing the optical anisotropic element 56 to separate the polarized direction of the laser beam L substantially equally with respect to the two axes.

In the fourth embodiment, two focused positions are formed in the vicinity of the sensitive recording medium F to virtually increase the depth of focus. However, four focused positions may be formed to further increase the depth of focus. For example, two optical anisotropic elements are disposed on the optical axis in convergent or divergent regions of the laser beam L, and each of two laser beams separated by the first optical anisotropic element is further separated into two laser beams by the second optical anisotropic element for thereby generating fourth focused positions on the optical axis.

Figure 20:
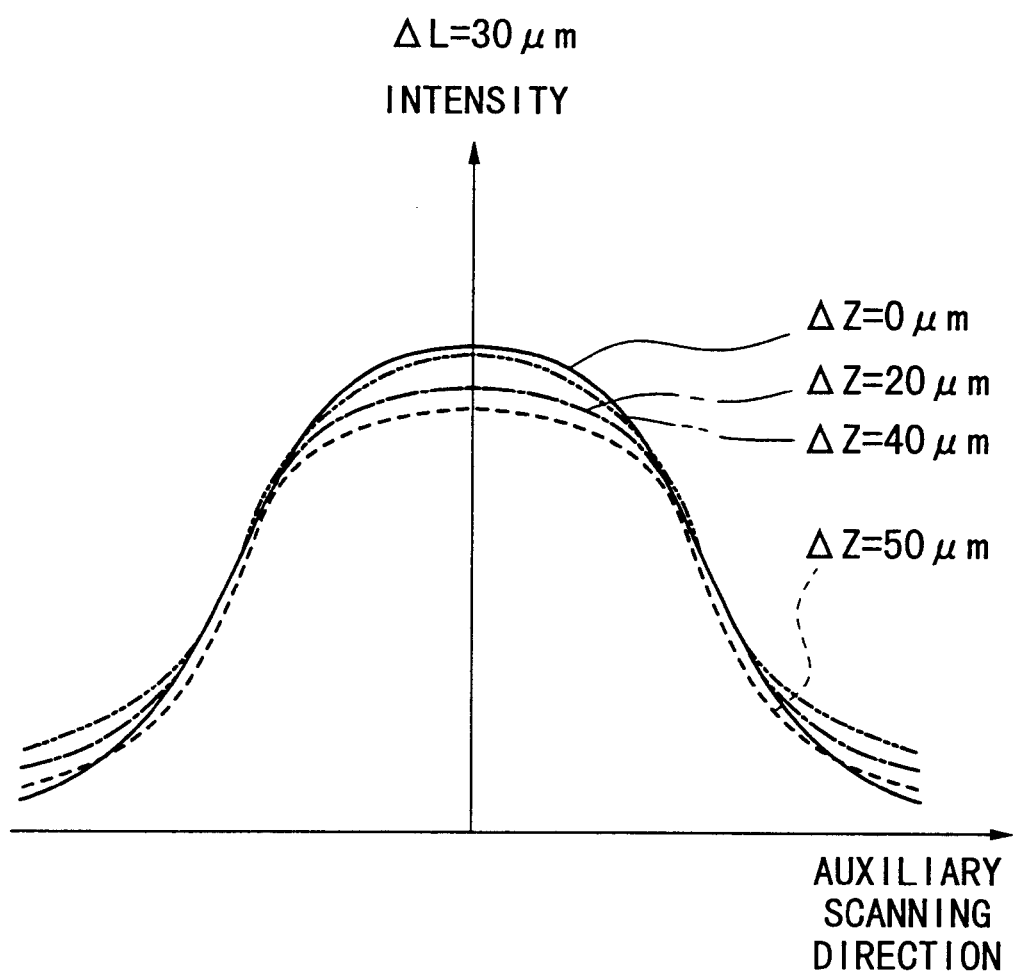
FIG. 20 is a diagram showing a beam intensity distribution in the vicinity of a recording medium in the case where four focused positions are generated by the optical anisotropic element in the laser beam recording apparatus according to the fourth embodiment.

FIG. 20 shows an intensity distribution of the laser beam L at the time the central points between the four focused positions which are spaced from each other by a maximum distance $\Delta L$ of 30 $\mu$m are spaced from the sensitive recording medium F by distances $\Delta Z=0$ $\mu$m, 20 $\mu$m, 40 $\mu$m, and 50 $\mu$m. It can be seen from FIG. 20 that changes in the beam intensity distribution with respect to the distance $\Delta Z$ are much smaller than when the two focused positions are produced.

Figure 21:
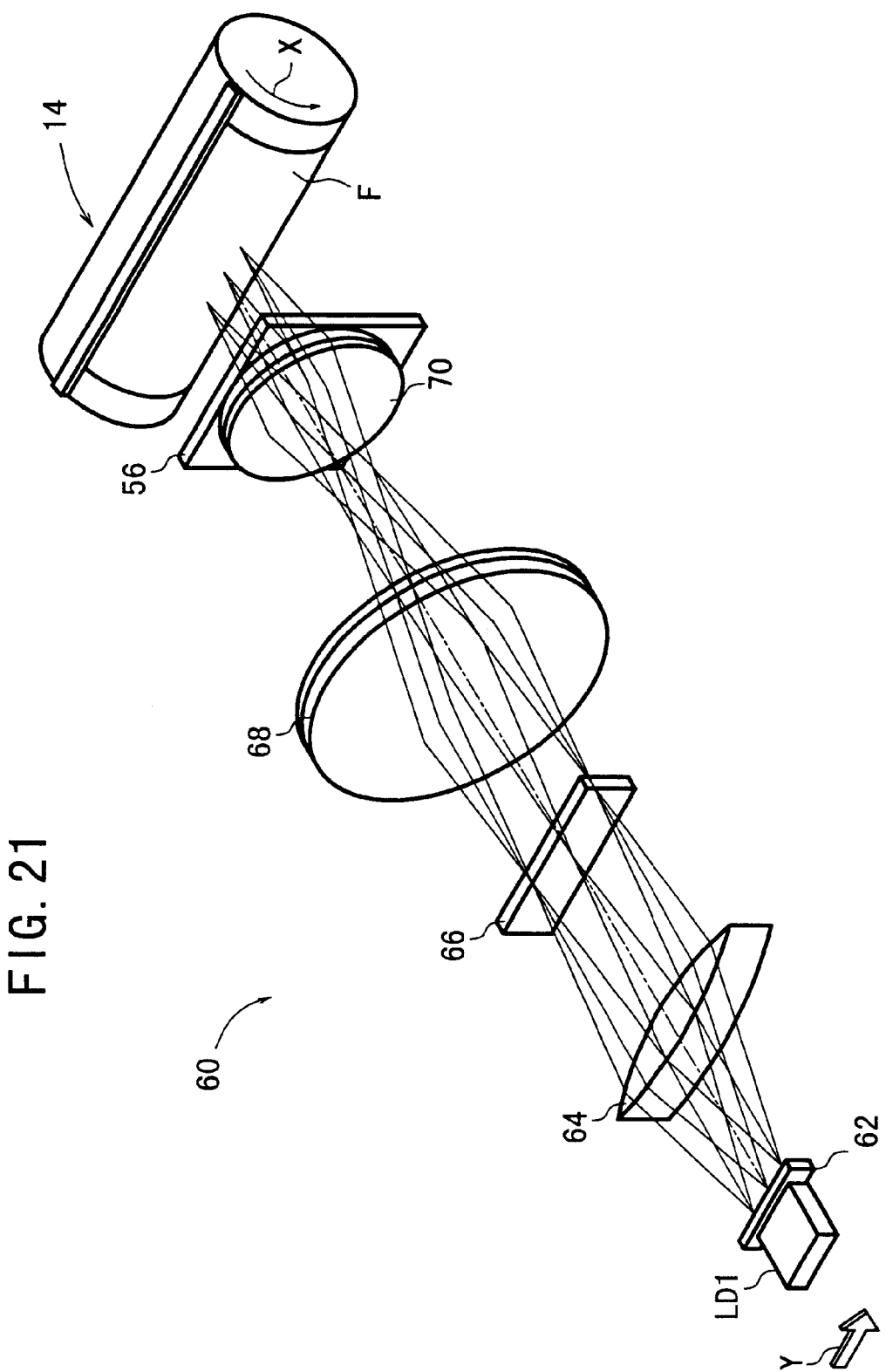
FIG. 21 is a perspective view of an exposure head of a laser beam recording apparatus where a laser array is used in place of a semiconductor laser in the fourth embodiment.

The principles of the fourth embodiment are also applicable to a laser beam recording apparatus 60 which employs a laser array LD1, as shown in FIG. 21.

As shown in FIG. 21, the laser array LD1 comprises an array of semiconductor lasers along the auxiliary scanning direction indicated by the arrow Y. A plurality of laser beams L emitted from the respective semiconductor lasers of the laser array LD1 are focused by a cylindrical lens 64 in the main scanning direction indicated by the arrow X. Thereafter, the laser beams L are guided as parallel-ray beams with respect to the auxiliary scanning direction indicated by the arrow Y to a spatial optical modulator 66 by a collimator lens 64. The spatial optical modulator 66 serves to modulate the laser beams L with an image signal, and may comprise a liquid crystal shutter, for example. The laser beams L that have passed through the spatial optical modulator 66 are focused by condenser lenses 68, 70, and then focused at two positions near the sensitive recording medium F by the optical anisotropic element 56 that is positioned in convergent regions of the laser beams L. As a result, an image is formed highly accurately on the sensitive recording medium F by the laser beams L that have been modulated by the spatial optical modulator 66.

Figure 22:
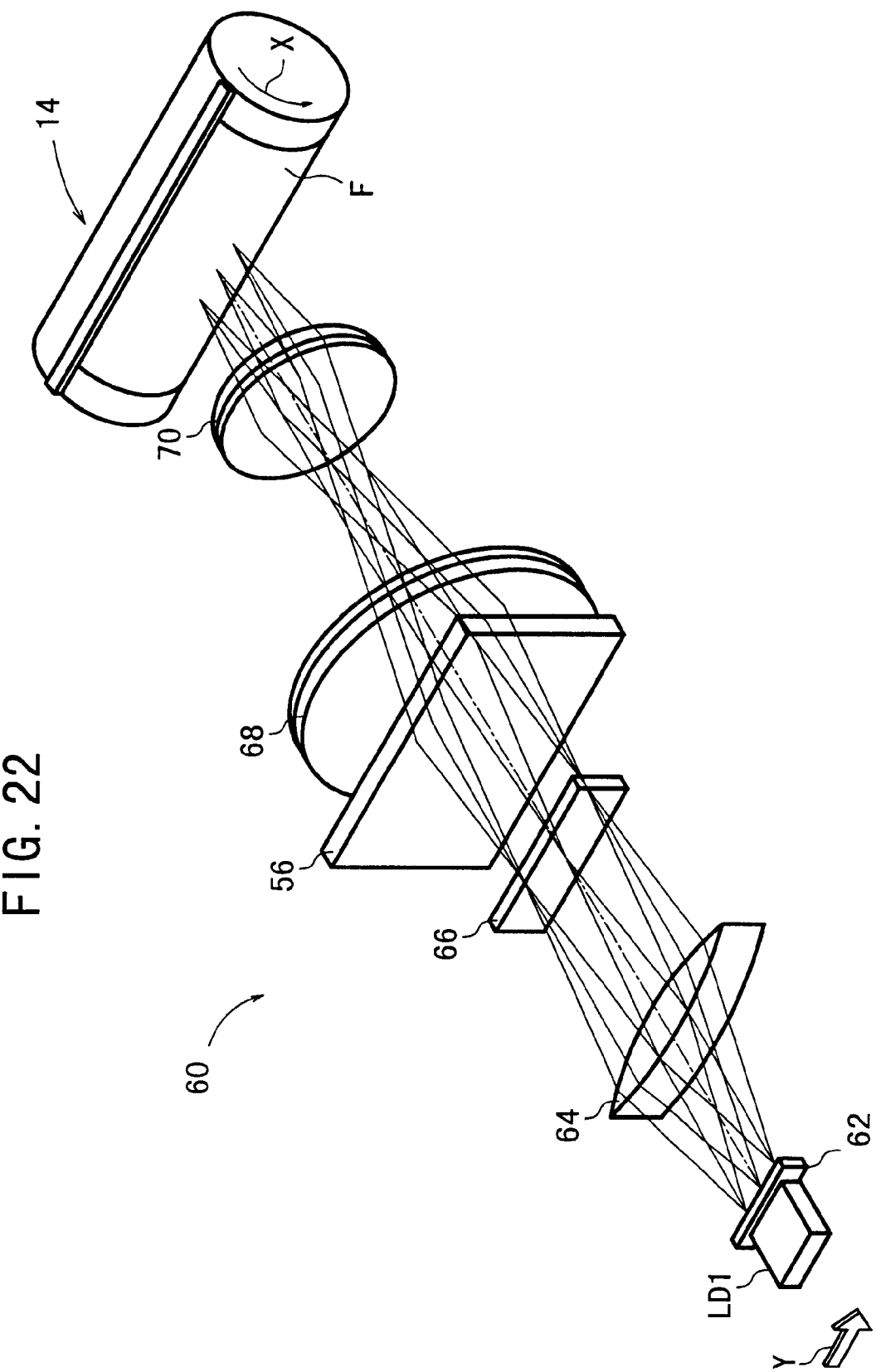
FIG. 22 is a perspective view of a laser beam recording apparatus where an optical anisotropic element shown in FIG. 21 is disposed in diverging portions of laser beams.

FIG. 22 shows a laser beam recording apparatus in which the optical anisotropic element 56 shown in FIG. 21 is positioned in divergent regions of the laser beams L. The laser beam recording apparatus shown in FIG. 22 is also capable of forming a highly accurate image on the sensitive recording medium F.

In the first through fourth embodiments, the sensitive recording medium F is mounted on the outer circumferential surface of the drum 14. However, the principles of the present invention are also applicable to an image recording apparatus in which the sensitive recording medium F is mounted on the inner circumferential surface of the drum 14, or an image recording apparatus in which a flat sensitive recording medium is scanned by a laser beam or laser beams.

The semiconductor laser LD may be an array of index-guided semiconductor lasers along the auxiliary scanning direction, an optical-fiber-coupled laser, a single transverse-mode laser, or the like, instead of the single index-guided semiconductor laser which emits a laser beam L that is wide in the auxiliary scanning direction. The sensitive recording medium F may be a thermosensitive recording medium, a photosensitive recording medium for use in printing, a photosensitive recording medium for use as a printing plate, etc.

The plural-focused-positions generating means may be made of a biaxial crystal rather than the uniaxial crystal, or a non-solid optical anisotropic element such as a liquid crystal.

The optical anisotropic element may have an anti-reflective coating on a surface thereof for increased transmittance of the laser beam L.

Although certain preferred embodiments of the present invention have been shown and described in detail, it should be understood that various changes and modifications may be made therein without departing from the scope of the appended claims.

What is claimed is:

1. An image recording apparatus for guiding a light beam to a recording medium and moving the light beam and the recording medium relatively to each other to thereby scan the recording medium with the light beam in main and auxiliary scanning directions to record an image on the recording medium, comprising:

a light source for emitting the light beam;

a focusing optical system for focusing the light beam emitted from said light source with respect to said recording medium;

an optical shaping system for shaping the light beam to shape a beam spot on the recording medium; and plural-focused-positions generating means for generating a plurality of focused positions close to said recording medium along an optical axis of the light beam at least in one of two arbitrary planes, the planes including the optical axis of the light beam and one of the planes being in parallel with the auxiliary scanning direction, and being perpendicular to the other plane;

wherein said plural-focused-positions generating means generates focused positions in front of and behind the recording medium for increasing a depth of focus;

wherein said plural-focused-positions generating means comprises an optical anisotropic element;

wherein said plural-focused-positions generating means is disposed in a divergent or convergent region of said light beam;

wherein said plural-focused-positions generating means comprises a uniaxial crystal, said uniaxial crystal forming a crystal plate;

wherein said light source comprises a semiconductor laser for emitting a laser beam having a substantially square-shaped intensity distribution with respect to the auxiliary scanning direction, for recording an area-modulated image on the recording medium; and wherein the light beam has a substantially linear shape in which a beam intensity distribution in the main scanning direction is narrower than a beam intensity distribution in the auxiliary scanning direction.

2. An image recording apparatus according to claim 1, wherein said plural-focused-positions generating means is disposed at a plurality of positions along the optical axis of the light beam.

3. An image recording apparatus according to claim 1, further comprising at least one half-wave plate or quarter-wave plate disposed between said light source and said plural-focused-positions generating means.

4. An image recording apparatus for guiding a light beam to a recording medium and moving the light beam and the recording medium relatively to each other for thereby scanning the recording medium with the light beam in main and auxiliary scanning directions to record an image on the recording medium, comprising:

a recording medium;

a light source for emitting a light beam;

cylindrical lens means for diverging or converging the light beam emitted from said light source only in one of the main and auxiliary scanning directions;

a focusing optical system for focusing components of said light beam in the main and auxiliary scanning directions with respect to said recording medium; and an optical anisotropic element disposed in a path of said light beam which is diverged or converged by said cylindrical lens means, and having different refractive indexes respectively in the main and auxiliary scanning directions;

wherein said focusing optical system generates focused positions in front of and behind the recording medium for increasing a depth of focus;

wherein said optical anisotropic element comprises a uniaxial crystal and said uniaxial crystal forms a crystal plate.

5. An image recording apparatus according to claim 4, wherein said light source comprises a semiconductor laser for emitting a laser beam having a substantially square-shaped intensity distribution with respect to the auxiliary scanning direction, for recording an area-modulated image on the recording medium;

wherein the light beam has a substantially linear shape in which a beam intensity distribution in the main scanning direction is narrower than a beam intensity distribution in the auxiliary scanning direction; and wherein said focusing optical system generates focused positions in front of and behind said recording medium along the optical axis of the light beam at least in a plane including the optical axis of the light beam and being in parallel with the auxiliary scanning direction.

6. An image recording apparatus according to claim 4, wherein said cylindrical lens means comprises a plurality of cylindrical lenses disposed between said light source and said recording medium, for diverging or converging the light beam in the main and auxiliary scanning direction, said optical anisotropic element being disposed in a path of the light beam which diverges or converges in the main scanning direction and a path of the light beam which diverges or converges in the auxiliary scanning direction.

7. An image recording apparatus according to claim 4, further comprising at least one half-wave plate or quarter-wave plate disposed between said light source and said optical anisotropic element.

8. An image recording apparatus for guiding a light beam to a recording medium and moving the light beam and the recording medium relatively to each other for thereby scanning the recording medium with the light beam in main and auxiliary scanning directions to record an image on the recording medium, comprising:

a recording medium;

a light source for emitting a light beam;

a cylindrical lens for diverging or converging the light beam emitted from said light source only in one of the main and auxiliary scanning directions;

a focusing optical system for focusing components of said light beam in the main and auxiliary scanning directions with respect to said recording medium;

a first optical anisotropic element disposed in a path of said light beam which is diverged or converged by said cylindrical lens; and a second optical anisotropic element disposed in a path of said light beam which is diverged or converged by said focusing optical system, and having different refractive indexes respectively in the main and auxiliary scanning directions;

wherein said focusing optical system generates focused positions in front of and behind the recording medium for increasing a depth of focus;

wherein said first and second optical anisotropic elements comprise a uniaxial crystal and said uniaxial crystal forms a crystal plate.

9. An image recording apparatus according to claim 8, wherein said light source comprises a semiconductor laser for emitting a laser beam having a substantially square-shaped intensity distribution with respect to the auxiliary scanning direction, for recording an area-modulated image on the recording medium;

wherein the light beam has a substantially linear shape in which a beam intensity distribution in the main scanning direction is narrower than a beam intensity distribution in the auxiliary scanning direction; and wherein said focusing optical system generates focused positions in front of and behind said recording medium along the optical axis of the light beam at least in a plane including the optical axis of the light beam and being in parallel with the auxiliary scanning direction.

10. An image recording apparatus according to claim 8, further comprising at least one half-wave plate or quarter-wave plate disposed between said light source and said first and second optical anisotropic elements.

11. An image recording apparatus for guiding a light beam to a recording medium and moving the light beam and the recording medium relatively to each other to thereby scan the recording medium with the light beam in main and auxiliary scanning directions to record an image on the recording medium, comprising:

a light source for emitting the light beam;

a focusing optical system for focusing the light beam emitted from said light source with respect to said recording medium; and first and second plural-focused-positions generating means for generating a plurality of focused positions close to said recording medium along an optical axis of the light beam at least in one of two arbitrary planes, the planes including the optical axis of the light beam and being perpendicular to each other;

wherein said first plural-focused-positions generating means generates focused positions in front of and behind the recording medium along the optical axis of the light beam only in a plane including the optical axis of the light beam and being in parallel with the main scanning direction for increasing a depth of focus;

wherein said second plural-focused-positions generating means generates focused positions in front of and behind the recording medium along the optical axis of the light beam only in a plane including the optical axis of the light beam and being in parallel with the main scanning direction for increasing a depth of focus;

wherein said plural-focused-positions generating means comprises an optical anisotropic element;

wherein said plural-focused-positions generating means is disposed in a divergent or convergent region of said light beam; and wherein said plural-focused-positions generating means comprises a uniaxial crystal, said uniaxial crystal forming a crystal plate.

* * * * *

UNITED STATES PATENT AND TRADEMARK OFFICE
CERTIFICATE OF CORRECTION

PATENT NO.    : 6,542,178 B2
DATED         : April 1, 2003
INVENTOR(S)   : Ichirou Miyagawa and Hirofumi Saita It is certified that error appears in the above-identified patent and that said Letters Patent is hereby corrected as shown below:

<u>Title page,</u>
Item [30], Foreign Application Priority Data, delete
"July 6, 1998   (JP) ………………………….. 10-190260"

Signed and Sealed this

Ninth Day of September, 2003

JAMES E. ROGAN
*Director of the United States Patent and Trademark Office*